United States Patent
Komori et al.

(10) Patent No.: US 11,753,515 B2
(45) Date of Patent: Sep. 12, 2023

(54) METHOD FOR PRODUCING MOLDED FOAM ARTICLES, AND MOLDED FOAM ARTICLES

(71) Applicant: SUMITOMO CHEMICAL COMPANY, LIMITED, Tokyo (JP)

(72) Inventors: Kazuhiro Komori, Katsuragi (JP); Yusuke Aikyo, Tsukuba (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 424 days.

(21) Appl. No.: 16/982,648

(22) PCT Filed: Mar. 27, 2019

(86) PCT No.: PCT/JP2019/013193
§ 371 (c)(1),
(2) Date: Sep. 21, 2020

(87) PCT Pub. No.: WO2019/189361
PCT Pub. Date: Oct. 3, 2019

(65) Prior Publication Data
US 2021/0024716 A1 Jan. 28, 2021

(30) Foreign Application Priority Data

Mar. 29, 2018 (JP) .................. 2018-064240
May 22, 2018 (JP) .................. 2018-098222

(51) Int. Cl.
| | | |
|---|---|---|
| C08J 9/12 | (2006.01) | |
| B29C 44/34 | (2006.01) | |
| B29C 44/42 | (2006.01) | |
| B29K 67/00 | (2006.01) | |
| B29K 105/00 | (2006.01) | |

(52) U.S. Cl.
CPC ........... *C08J 9/122* (2013.01); *B29C 44/3449* (2013.01); *B29C 44/42* (2013.01); *B29K 2067/00* (2013.01); *B29K 2105/0079* (2013.01); *C08J 2367/02* (2013.01); *C08J 2467/02* (2013.01); *C08J 2477/06* (2013.01)

(58) Field of Classification Search
CPC .... C08J 9/122; C08J 2367/02; C08J 2467/02; C08J 2477/06; C08J 9/0066; C08J 2201/03; C08J 2203/06; C08J 2203/08; C08J 2367/03; C08J 2367/04; B29C 44/3449; B29C 44/42; B29C 44/3446; B29C 45/00; B29C 45/26; B29K 2067/00; B29K 2105/0079
See application file for complete search history.

(56) References Cited

U.S. PATENT DOCUMENTS

| | | | |
|---|---|---|---|
| 5,997,765 A | 12/1999 | Furuta et al. | |
| 2003/0228485 A1 | 12/2003 | Yusa et al. | |
| 2010/0140824 A1 | 6/2010 | Jaarsma | |
| 2013/0116354 A1 | 5/2013 | Rohatgi et al. | |
| 2016/0032068 A1 | 2/2016 | Nakagawa et al. | |
| 2019/0264023 A1 | 8/2019 | Sakai et al. | |
| 2019/0309136 A1 | 10/2019 | Sakai et al. | |

FOREIGN PATENT DOCUMENTS

| | | |
|---|---|---|
| CN | 107722577 A | 2/2018 |
| EP | 1 813 650 A1 | 8/2007 |
| EP | 1 980 384 A1 | 10/2008 |
| EP | 2 636 703 A1 | 9/2013 |
| JP | 05-239247 A | 9/1993 |
| JP | 06-506724 A | 7/1994 |
| JP | 10-158493 A | 6/1998 |
| JP | 2001-139714 A | 5/2001 |
| JP | 2001-219523 A | 8/2001 |

(Continued)

OTHER PUBLICATIONS

T-100 Series system from Trexel delivers super-critical fluid, 20015.*
JP2007015231, English translation (machine), Jan. 2007.*
Chinese Office Action issued in corresponding Chinese Patent Application No. 201980021819.7, dated Apr. 20, 2022, with English translation.
Japanese Notice of Reasons for Refusal issued in corresponding Japanese Patent Application No. 2018-098222, dated Aug. 24, 2021, with English translation.

(Continued)

*Primary Examiner* — Irina S Zemel

(74) *Attorney, Agent, or Firm* — McDermott Will & Emery LLP

(57) ABSTRACT

A method for producing molded foam articles that molds molded foam articles continuously, the method comprising continuously repeating the following step 1, step 2, step 3 and step 4 in this order; wherein step 1 comprises melting a resin composition that includes a liquid crystal polyester; step 2 comprises introducing, with an introduction device, a supercritical fluid that is unreactive, in a supercritical state, with the liquid crystal polyester, and is a gas at normal temperature and normal pressure, into the resin composition in an amount of at least 0.1 parts by mass but not more than 0.3 parts by mass per 100 parts by mass of the liquid crystal polyester, and then melt-kneading the resultant mixture; step 3 comprises injecting the melt-kneaded resin composition containing the supercritical fluid into a mold; and step 4 comprises conducting foaming by lowering at least one of the pressure and the temperature of the supercritical fluid contained in the resin composition to a value below the critical point of the supercritical fluid, thereby producing a molded foam article. This liquid crystal polyester has a melt tension at a temperature 20° C. higher than the flow start temperature of at least 5 mN but not more than 100 mN.

8 Claims, 1 Drawing Sheet

(56) References Cited

FOREIGN PATENT DOCUMENTS

| | | | |
|---|---|---|---|
| JP | 2003-103556 A | | 4/2003 |
| JP | 2003-138054 A | | 5/2003 |
| JP | 2004-168841 A | | 6/2004 |
| JP | 2004-218062 A | | 8/2004 |
| JP | 2007015231 | * | 1/2007 |
| JP | 2011-052037 A | | 3/2011 |
| JP | 2013-053271 A | | 3/2013 |
| JP | 2013-185044 A | | 9/2013 |
| JP | 6025241 B2 | | 11/2016 |
| JP | 2017-165906 A | | 9/2017 |
| WO | 92/17533 A1 | | 10/1992 |
| WO | 2018/092838 A1 | | 5/2018 |
| WO | 2018/092845 A1 | | 5/2018 |

OTHER PUBLICATIONS

Extended European Search Report issued in corresponding European Patent Application No. 19774658.9-1017, dated Dec. 6, 2021.
J. Colton and N.P. Suh, "The Nucleation of Microcellular Thermoplastic Foam With Additives: Part I: Theoretical Considerations", Polymer Engineering & Science, Mid-Apr. 1987, vol. 27, No. 7, pp. 485-492.
International Search Report issued in corresponding International Patent Application No. PCT/JP2019/013193, dated Jun. 25, 2019, with English translation.
Taiwanese Office Action issued in corresponding Taiwanese Patent Application No. 108110757, dated Aug. 26, 2022, with English translation.

* cited by examiner

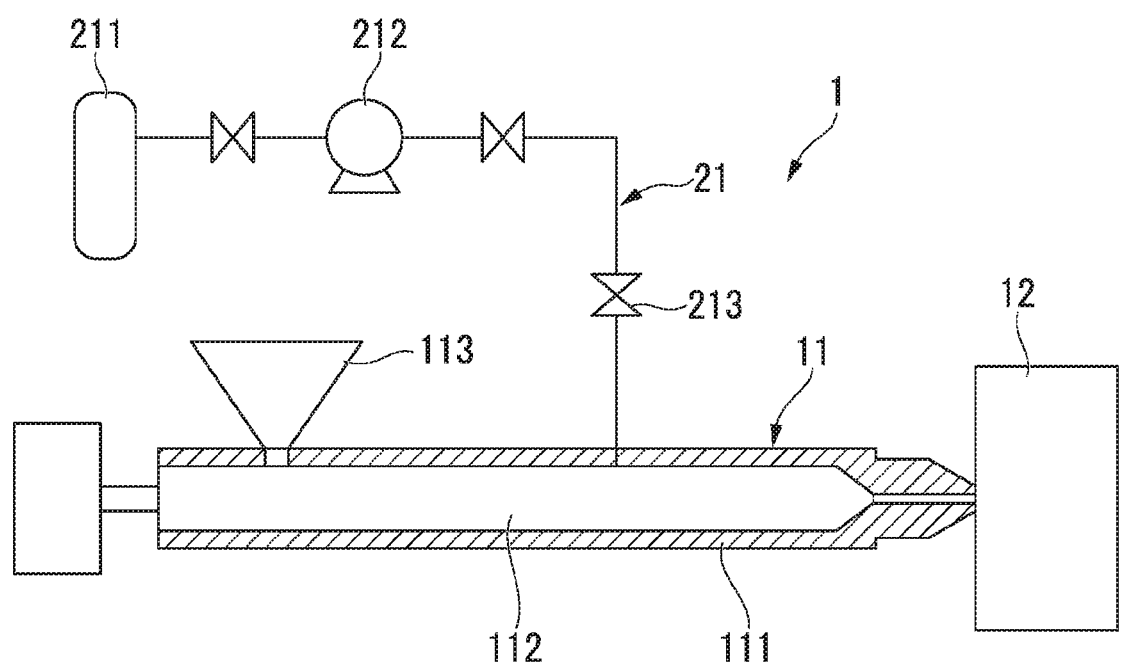

METHOD FOR PRODUCING MOLDED FOAM ARTICLES, AND MOLDED FOAM ARTICLES

CROSS REFERENCE TO RELATED APPLICATIONS

This application is the U.S. National Phase under 35 U.S.C. § 371 of International Application No. PCT/JP2019/013193, filed on Mar. 27, 2019, which claims the benefit of Japanese Application No. 2018-064240, filed on Mar. 29, 2018 and Japanese Application No. 2018-098222, filed on May 22, 2018, the entire contents of each are hereby incorporated by reference.

TECHNICAL FIELD

The present invention relates to method for producing molded foam articles, and molded foam articles.

BACKGROUND ART

In recent years, in the field of transportation equipment including automobiles and aircraft, weight reduction of members is being pursued for the purpose of improving fuel consumption. In order to lighten molded articles, the replacement of metals with resins and the application of resin molded foam articles are being investigated.

Among resins, liquid crystal polyesters are known as superior materials having heat resistance as well as superior mechanical properties and fluidity. Hereinafter, liquid crystal polyesters are sometimes referred to as "LCP". In order to reduce the weight of molded articles, while taking advantage of these characteristics of LCPs, foam molding of resin compositions containing an LCP are being investigated. Hereinafter, a resin composition containing an LCP is referred to as a "liquid crystal polyester resin composition".

In order to address these types of problems, supercritical fluids that function as physical foaming agents are being used favorably as foaming materials in the foam molding of liquid crystal polyester resin compositions.

For example, Patent Document 1 discloses a method for producing a molded foam article of a liquid crystal polyester resin composition that uses a supercritical fluid as a foaming material, a liquid crystal polyester resin composition, and a molded foam article produced from the composition.

Further, Patent Document 2 discloses a molded foam article of a liquid crystal polyester resin composition that uses a supercritical fluid as a foaming material. In Patent Document 2, the results of measuring and averaging the foam diameter of 500 random foam bubbles inside the molded article are also disclosed.

The molded foam articles that use these liquid crystal polyester resin compositions feature excellent thermal insulation properties and superior levels of sink marks and warping, in addition to the inherent mechanical characteristics of the liquid crystal polyester.

Non-Patent Document 1 describes the relationship between the density and the number of bubble nuclei in a melted resin of a gas component (hereinafter referred to as the raw material gas) that is dissolved in the melted resin as a foaming material. The document suggests that as the amount of the raw material gas dissolved in the melted resin is increased, thereby increasing the density of the raw material gas in the melted resin, the number of bubble nuclei also increases. In other words, it can be reasoned by analogy that by increasing the bubble nuclei, foaming can be accelerated, and a molded article having a large number of bubbles can be produced. Based on these findings, it is hypothesized that by increasing the amount of a supercritical fluid introduced into a melted resin, a molded article having a large number of bubbles can be produced.

CITATION LIST

Patent Documents

Patent Document 1: JP 602524-B
Patent Document 2: JP 2003-138054-A

Non-Patent Document

Non-Patent Document 1: J. Colton and N. P. Suh, Polymer Engineering & Science, 27, 485 (1987)

SUMMARY OF THE INVENTION

Problems to be Solved by the Invention

However, the invention disclosed in Patent Document 1 has a problem in that some liquid crystal polyesters cannot be subjected to foam molding.

Further, in Patent Document 2, although the foam diameter is used as an indicator of the foamed state, the foamed state of the entire molded foam article is unclear. Generally, the foamed state of a molded foam article tends to deteriorate markedly near the flow terminal of a resin. Consequently bubbles often coalesce to form non-uniform and huge cavities, and therefore a problem arises in that a simple evaluation of the foam diameter in a localized region in the molded article is unable to ascertain whether or not the foamed state of the entire molded foam article is uniform.

Moreover, when foam molding is conducted continuously, other problems sometimes arise, including instability in the weight of the molded foam articles with large fluctuations in the weight, and a lack of uniformity in the foamed state inside the molded articles.

The present invention has been developed in light of these circumstances, and has the objects of providing a method for producing molded foam articles that enables a resin composition containing an LCP to be foamed uniformly, and enables suppression of fluctuations in the weight of the molded foam articles, as well as providing a molded foam article.

Means to Solve the Problems

The inventors of the present invention discovered that by increasing the amount of supercritical fluid introduced when continuously molding LCP molded foam articles, not only did the foamed state of the produced molded articles lose uniformity, but fluctuation in the weight of the molded articles also increased.

Moreover, they also discovered that, when introducing a supercritical fluid into a melted resin, if the amount of supercritical fluid introduced was outside a specific range, then the foamed state of the produced molded foam articles lost uniformity. Further, the inventors also discovered that when the melt tension of the liquid crystal polyester was outside a specific range, not only did the foamed state of the produced molded articles lose uniformity, but fluctuation in the weight of the molded articles also increased.

Based on the above findings, the inventors of the present invention discovered that by continuously repeating an operation for molding molded foam articles in which a specific amount of a supercritical fluid is introduced into and melt-kneaded with a resin composition containing a liquid crystal polyester having a melt tension within a specific range, a uniform foamed state could be achieved inside the molded articles.

That is, the present invention provides the following [1] to [9].

[1] A method for producing molded foam articles that molds molded foam articles continuously, the method comprising a step 1 of melting a resin composition including a liquid crystal polyester, a step 2 of using an introduction device to introduce at least 0.1 parts by mass but not more than 0.3 parts by mass, per 100 parts by mass of the liquid crystal polyester, of a foaming material formed from a supercritical fluid that is unreactive, in a supercritical state, with the liquid crystal polyester, and is a gas at normal temperature and normal pressure, and then melt-kneading the resultant mixture, a step 3 of injecting the melt-kneaded resin composition into a mold, and a step 4 of conducting foaming by lowering at least one of the pressure and the temperature of the foaming material to a value below the critical point of the foaming material, wherein step 1, step 2, step 3 and step 4 are repeated continuously in this order, and the liquid crystal polyester has a melt tension at a temperature 20° C. higher than the flow start temperature of at least 5 mN but not more than 100 mN.

[2] The method for producing molded foam articles according to [1], wherein the liquid crystal polyester has repeating units represented by general formulas (1), (2) and (3) shown below.

  (1)

  (2)

  (3)

(In the formulas, $Ar^1$ represents a phenylene group, naphthylene group or biphenylylene group; $Ar^2$ and $Ar^3$ each independently represent a phenylene group, naphthylene group, biphenylylene group, or a group represented by general formula (4) shown below; X and Y each independently represent an oxygen atom or an imino group; and one or more hydrogen atoms in $Ar^1$, $Ar^2$ and $Ar^3$ may each be independently substituted with a halogen atom, an alkyl group or an aryl group.)

  (4)

(In the formula, $Ar^4$ and $Ar^5$ each independently represent a phenylene group or a naphthylene group; and Z represents an oxygen atom, sulfur atom, carbonyl group, sulfonyl group or alkylidene group.)

[3] The method for producing molded foam articles according to [1] or [2], wherein following injection of the melt-kneaded resin composition into the mold, the resin composition is foamed using the core-back method.

[4] The method for producing molded foam articles according to any one of [1] to [3], wherein the introduction device comprises a feedback unit that measures the amount introduced of the supercritical fluid and can perform feedback control based on the measurement result.

[5] The method for producing molded foam articles according to any one of [1] to [4], wherein the supereritical fluid is nitrogen.

[6] The method for producing molded foam articles according to any one of [1] to [5], wherein the resin composition comprises an inorganic filler in an amount exceeding 0 parts by mass but not more than 100 parts by mass per 100 parts by mass of the liquid crystal polyester.

[7] The method for producing molded foam articles according to any one of [1] to [6], wherein the viscosity of the resin composition at a temperature 20° C. higher than the flow start temperature is at least 200 Pa·s but not more than 5,000 Pa·s.

[8] A molded foam article that uses a resin composition comprising a liquid crystal polyester having repeating units represented by formulas (1), (2) and (3) shown below and also comprising an inorganic filler in an amount exceeding 0 parts by mass but not more than 100 parts by mass per 100 parts by mass of the liquid crystal polyester, and having a viscosity at a temperature 20° C. higher than the flow start temperature of at least 200 Pa·s but not more than 5,000 Pa·s and a melt tension at a temperature 20° C. higher than the flow start temperature of at least 5 mN but not more than 100 mN.

  (1)

  (2)

  (3)

(In the formulas, $Ar^1$ represents a phenylene group, naphthylene group or biphenylylene group; $Ar^2$ and $Ar^3$ each independently represent a phenylene group, naphthylene group, biphenylylene group, or a group represented by formula (4) shown below; X and Y each independently represent an oxygen atom or an imino group; and one or more hydrogen atoms in $Ar^1$, $Ar^2$ and $Ar^3$ may each be independently substituted with a halogen atom, an alkyl group or an aryl group.)

  (4)

(In the formula, $Ar^4$ and $Ar^5$ each independently represent a phenylene group or a naphthylene group; and Z represents an oxygen atom, sulfur atom, carbonyl group, sulfonyl group or alkylidene group.)

[9] The molded foam article according to [8], having a thin-wall portion with a thickness of 4.0 mm or less.

In other words, the present invention includes the following aspects.

[1'] A method for producing molded foam articles that molds molded foam articles continuously, the method comprising continuously repeating the following step 1, step 2, step 3 and step 4 in this order, wherein step 1 comprises melting a resin composition that includes a liquid crystal polyester;

step 2 comprises introducing, with an introduction device, a supercritical fluid that is unreactive, in a supercritical state, with the liquid crystal polyester, and is a gas at normal temperature and normal pressure, into the resin composition in an amount of at least 0.1 parts by mass but not more than 0.3 parts by mass per 100 parts by mass of the liquid crystal polyester, and then melt-kneading the resultant mixture;

step 3 comprises injecting the melt-kneaded resin composition containing the supercritical fluid into a mold;

step 4 comprises conducting foaming by lowering at least one of the pressure and the temperature of the supercritical fluid contained in the resin composition to a value below the critical point of the supercritical fluid, thereby producing a molded foam body; and the liquid crystal polyester has a melt tension at a temperature 20° C. higher than the flow start temperature of at least 5 mN but not more than 100 mN.

[2'] The method for producing molded foam articles according to [1'], wherein the liquid crystal polyester has a repeating unit represented by general formula (1) shown below, a repeating unit represented by general formula (2) shown below, and a repeating unit represented by general formula (3) shown below.

  (1)

  (2)

  (3)

(In the formulas, $Ar^1$ represents a phenylene group, naphthylene group or biphenylylene group; $Ar^2$ and $Ar^3$ each independently represent a phenylene group, naphthylene group, biphenylylene group, or a group represented by general formula (4) shown below; X and Y each independently represent an oxygen atom or an imino group; and at least one hydrogen atom in $Ar^1$, $Ar^2$ and $Ar^3$ may be independently substituted with a halogen atom, an alkyl group or an aryl group.)

  (4)

(In the formula, $Ar^4$ and $Ar^5$ each independently represent a phenylene group or a naphthylene group; and Z represents an oxygen atom, sulfur atom, carbonyl group, sulfonyl group or alkylidene group.)

[3'] The method for producing molded foam articles according to [1'] or [2'], wherein following injection of the melt-kneaded resin composition containing the supercritical fluid into the mold, the resin composition containing the supercritical fluid is foamed using the core-back method.

[4] The method for producing molded foam articles according to any one of [1'] to [3'], further comprising measuring the amount introduced of the supercritical fluid, and performing feedback control of the amount introduced of the supercritical fluid based on the measurement result.

[5'] The method for producing molded foam articles according to any one of [1'] to [4'], wherein the supercritical fluid is nitrogen.

[6'] The method for producing molded foam articles according to any one of [1'] to [5'], wherein the resin composition comprises an inorganic filler in an amount exceeding 0 parts by mass but not more than 100 parts by mass per 100 parts by mass of the liquid crystal polyester.

[7'] The method for producing molded foam articles according to any one of [1'] to [6'], wherein the viscosity of the resin composition at a temperature 20° C. higher than the flow start temperature is at least 200 Pa·s but not more than 5,000 Pa·s.

[8'] A molded foam article that is foam molded from a foaming material and a resin composition, wherein the resin composition comprises a liquid crystal polyester having a repeating unit represented by general formula (1) shown below, a repeating unit represented by general formula (2) shown below and a repeating unit represented by general formula (3) shown below, and also comprises an inorganic filler, the amount of the inorganic filler exceeds 0 parts by mass but is not more than 100 parts by mass per 100 parts by mass of the liquid crystal polyester, the resin composition has a viscosity at a temperature 20° C. higher than the flow start temperature of the resin composition of at least 200 Pa·s but not more than 5,000 Pa·s, and the liquid crystal polyester has a melt tension at a temperature 20° C. higher than the flow start temperature of the liquid crystal polyester of at least 5 mN but not more than 100 mN.

  (1)

  (2)

  (3)

(in the formulas, $Ar^1$ represents a phenylene group, naphthylene group or biphenylylene group; $Ar^2$ and $Ar^3$ each independently represent a phenylene group, naphthylene group, biphenylylene group, or a group represented by general formula (4) shown below; X and Y each independently represent an oxygen atom or an imino group; and at least one hydrogen atom in $Ar^1$, $Ar^2$ and $Ar^3$ may be independently substituted with a halogen atom, an alkyl group or an aryl group.)

  (4)

(In the formula, $Ar^4$ and $Ar^5$ each independently represent a phenylene group or a naphthylene group; and Z represents an oxygen atom, sulfur atom, carbonyl group, sulfonyl group or alkylidene group.)

[9'] The molded foam article according to [8'], having a thin-wall portion with a thickness of 4.0 mm or less.

Effects of the Invention

The present invention can provide a method for producing molded foam articles that enables a resin composition containing an LCP to be foamed uniformly, and enables suppression of fluctuations in the weight of the molded foam articles, and can also provide a molded foam article.

BRIEF DESCRIPTION OF DRAWINGS

FIG. 1 is a schematic illustration of an injection molding machine used in the production of molded foam articles of an embodiment of the present invention.

EMBODIMENTS FOR CARRYING OUT THE INVENTION

<Method for Producing Molded Foam Articles>

One embodiment of the present invention is a method for producing molded foam articles that molds molded foam articles continuously.

The method for producing molded foam articles of this embodiment comprises a step 1 of melting a resin composition including a liquid crystal polyester, a step 2 of introducing, with an introduction device, a supercritical fluid that is unreactive, in a supercritical state, with the liquid crystal polyester, and is a gas at normal temperature and normal pressure, into the resin composition in an amount of at least 0.1 parts by mass but not more than 0.3 parts by mass per 100 parts by mass of the liquid crystal polyester, and then melt-kneading the resultant mixture, a step 3 of injecting the melt-kneaded resin composition containing the supercritical fluid into a mold, and a step 4 of conducting foaming by lowering at least one of the pressure and the temperature of the supercritical fluid contained in the resin composition to a value below the critical point of the supercritical fluid, thereby producing a molded foam article. Moreover, step 1, step 2, step 3 and step 4 are repeated continuously in this order.

Here, "continuously" means that the series of molding operations from step 1 to step 4 is repeated at least twice. In an embodiment of the present invention, the series of molding operations is preferably repeated at least 10 times, more preferably repeated at least 20 times, and particularly preferably repeated 30 or more times.

When the number of repetitions of the above molding operations exceeds 10, the dispersed state of the supercritical fluid contained in the melted resin (the resin composition containing the melted liquid crystal polyester) inside a cylinder 111 becomes uniform, and molded foam articles having a uniform foamed state can be produced.

Here, "uniform" means a state in which the melted resin and the supercritical fluid have formed a single phase.

On the other hand, those cases where the introduction of the supercritical fluid is not performed after every repetition of step 1, but is rather performed intermittently, are deemed to be excluded from the meaning of "continuous". In other words, within the series of molding operations from step 1 to step 4, cases where step 2 is omitted once every two repetitions, or omitted twice every three repetitions or the like, are deemed to be excluded from the meaning of "continuous".

FIG. 1 is a schematic illustration of an injection molding machine used for producing molded foam bodies according to an embodiment of the present invention.

This injection molding machine 1 is a machine for producing molded foam bodies of a prescribed shape using the resin composition and the supercritical fluid described below described below, and has a main body 11, a mold 12, and a supercritical fluid introduction device 21 for introducing the supercritical fluid into the main body 11.

The introduction device 21 comprises a gas cylinder 211 filled with a raw material gas of the supercritical fluid mentioned above, a pressurizer 212 for increasing the pressure of the raw material gas from the gas cylinder 211 to critical pressure, and a control valve 213 for controlling the amount of the raw material gas that has been pressurized to critical pressure (the supercritical fluid) that is introduced into the cylinder 111. The temperature of the raw material gas increases due to adiabatic compression of the raw material gas in the pressurizer 212, but in those cases where the temperature reached as a result of this temperature increase does not satisfy the critical temperature, if necessary, a heater may be used to increase the temperature of the raw material gas from the gas cylinder 211 to the critical temperature.

Next is a description of a method for producing molded foam bodies using this injection molding machine 1.

[Step 1]

Step 1 is a step that includes melting the resin composition containing a liquid crystal polyester.

First, the resin composition described above is fed into the cylinder 111 from a hopper 113, and the resin composition is melted (plasticized) by conducting heated melt-kneading inside the cylinder 111. In embodiments of the present invention, "plasticization metering" means the operation of melting (plasticizing) pellets of the resin composition in a short period of time by screw rotation, and loading the inside of the cylinder 111 with an amount of the resin composition required to fill the next injection process.

[Step 2]

Step 2 is a step that includes using a supercritical fluid that is unreactive, in a supercritical state, with the liquid crystal polyester, and is a gas at normal temperature and normal pressure (25° C., 1,013 hPa) as a foaming material, and using the introduction device to introduce the foaming material into the melted resin composition in an amount of at least 0.1 parts by mass but not more than 0.3 parts by mass per 100 parts by mass of the liquid crystal polyester and then melt-knead the resultant mixture.

In step 2, first, the gas cylinder 211 is opened, and the raw material gas is converted to a supercritical fluid by increasing the pressure and the temperature to values at least as high as the critical point in the pressurizer 212. By opening the control valve 213, the obtained supercritical fluid is introduced into the cylinder 111 and impregnated into the melted resin composition. In embodiments of the present invention, an amount of the supercritical fluid of at least 0.1 parts by mass but not more than 0.3 parts by mass per 100 parts by mass of the liquid crystal polyester is introduced into the melted resin composition by the introduction device 21 and melt-kneaded during each plasticization metering.

The introduction device 21 preferably comprises a feedback unit that measures the amount introduced of the supercritical fluid and can perform feedback control based on the measurement result (an example of the supercritical fluid introduction device is the T-100J manufactured by Trexel, Inc.). By using feedback control, oversupply or undersupply of the supercritical fluid can be suppressed. Specifically, the amount introduced of the supercritical fluid is controlled by monitoring and controlling the introduction time period and the differential pressure and the like of the supercritical fluid. This enables the abovementioned specific amount of the supercritical fluid to be introduced during each plasticization metering.

By ensuring that the amount introduced of the supercritical fluid is at least 0.1 parts by mass per 100 parts by mass of the liquid crystal polyester, the foaming of the resin proceeds adequately. Further, by ensuring that the amount is not more than 0.3 parts by mass per 100 parts by mass of the liquid crystal polyester, the foamed state inside the molded articles becomes uniform. If the amount introduced of the supercritical fluid exceeds 0.3 parts by mass per 100 parts by mass of the liquid crystal polyester, then the foamed state inside the molded articles can sometimes lose uniformity.

Further, if the amount introduced of the supercritical fluid is less than 0.1 parts by mass per 100 parts by mass of the liquid crystal polyester, then foaming of the resin may not proceed adequately, and molded foam articles may be unobtainable.

Moreover, by introducing the above prescribed amount of the supercritical fluid during each repetition of plasticization metering, fluctuations in the mass between individual molded articles (the standard deviation of the molded article weight) can be suppressed. In contrast, in those cases where the above prescribed amount of the supercritical fluid is not introduced during each plasticization metering, the foamed state inside the molded articles can sometimes lose uniformity. For example, even if the amount introduced of the supercritical fluid is at least 0.1 parts by mass but not more than 0.3 parts by mass per 100 parts by mass of the liquid crystal polyester, if the above prescribed amount of the supercritical fluid is only introduced at a frequency of once for every three repetitions of plasticization metering, then the foamed state inside the molded articles may sometimes lose uniformity.

[Step 3]

Step 3 is a step that includes injecting the melt-kneaded resin composition containing the supercritical fluid into a mold.

Using the screw 112, the melt-kneaded melted resin containing the supercritical fluid (the melted resin composition) inside the cylinder 111 is moved and injected into the mold 12. At this time, in order to maintain a state in which the melted resin is impregnated with the supercritical fluid, the mold 12 may be clamped or subjected to a counter pressure until the injection of the melted resin containing the supercritical fluid into the mold 12 is complete.

[Step 4]

Step 4 is a step that includes conducting foaming by lowering at least one of the pressure and the temperature of the supercritical fluid contained in the melt-kneaded resin composition to a value below the critical point of the supercritical fluid.

In an embodiment of the present invention, the injection molding method using the mold 12 may be any one of the short shot method, the full shot method and the core-back method. From the viewpoint of enabling proactive foaming by expanding the mold volume following filling of the mold with the melted resin, the core-back method is preferred.

The core-back method is a method in which, for example, by using a mold for which the cavity volume can be changed, the cavity volume is expanded after the mold has been filled with the melted resin, and includes both a method that utilizes the action of a mold sliding core, and a method that relies on the action of a movable platen of the molding machine.

The melted resin containing the supercritical fluid inside the cylinder 111 undergoes a fall in temperature during the step of using the screw 112 to inject the melted resin from inside the cylinder 111 into the mold 12 which has been adjusted to a desired temperature with a heater or the like. Moreover, the pressure, which was at least as high as the critical pressure, approaches normal pressure, and the solubility of the supercritical fluid contained in the melted resin deteriorates, causing a transition to the gaseous state. The supercritical fluid contained in the melted resin changes to a gaseous form, the volume expands, and a molded foam body is obtained. Subsequently, following cooling and solidification of the resin inside the mold 12, the molded article is removed from the mold 12 after a prescribed cooling time. By using the operations described above, molded foam articles can be obtained by injection molding.

In embodiments of the present invention, the steps 1 to 4 are repeated in this order. By executing step 2 and introducing a specific amount of the supercritical fluid each repetition, the foaming of the resin can be made more uniform.

As a result, fluctuations in the weight of the molded articles can be suppressed.

In this description, "weight fluctuations in the molded articles" means fluctuations between individual products.

(Supercritical Fluid)

The foaming material according to embodiments of the present invention is a supercritical fluid which, in the supercritical state, is unreactive with the liquid crystal polyester, and which is a gas at normal temperature and normal pressure.

Here, "supercritical fluid" is a term that indicates the state of a substance, which is not gaseous, liquid nor solid, exhibited under conditions equal to or exceeding a specific temperature and pressure (critical point). The critical point that represents a specific temperature and pressure are determined by the type of substance. A supercritical fluid exhibits superior permeability (solubility) in the melted resin compared with the substance in the gaseous state or liquid state, and can be dispersed uniformly within the melted resin.

In embodiments of the present invention, for example, inert gases such as carbon dioxide, nitrogen and helium, and air and the like are preferable as the supercritical fluid. In embodiments of the present invention, carbon dioxide and nitrogen are more preferable. Moreover, the critical point for nitrogen occurs at a temperature of −147° C. and a pressure of 3.4 MPa. and therefore normal temperature (25° C.) is higher than the critical temperature. Accordingly, the supercritical fluid can be adjusted by only controlling the pressure, meaning handling is easier, and therefore nitrogen is particularly desirable.

<<Resin Composition Containing Liquid Crystal Polyester>>

The resin composition containing a liquid crystal polyester according to an embodiment of the present invention contains a liquid crystal polyester and an arbitrary inorganic filler.

(Liquid Crystal Polyester)

The liquid crystal polyester according to an embodiment of the present invention has a melt tension at a temperature 20° C. higher than the flow start temperature of at least 5 mN but not more than 100 mN.

Here, the flow start temperature is also called the flow temperature or fluidity temperature, and acts as an indicator of the molding temperature during injection molding of the liquid crystal polyester. During injection molding, the molding is generally conducted at a temperature higher than the flow start temperature. The flow start temperature is measured using a capillary rheometer having a nozzle with an internal diameter of 1 mm and a length of 10 mm, and represents the temperature at which the melt viscosity reaches 4,800 Pa·s (48,000 poise) when the heated and melted liquid crystal polyester is extruded from the nozzle while the temperature is raised at a rate of 4° C./minute under a loading of 9.8 MPa (100 kg/cm$^2$).

The melt tension can be measured using the following method.

Using a capillary rheometer, the liquid crystal polyester is extruded from a nozzle having an internal diameter of 1 mm and a length of 10 mm, at a temperature 20° C. higher than the flow start temperature of the liquid crystal polyester contained in the resin composition, by lowering a piston (10 nm) at a rate of 10 mm/minute. The melt tension at this time is measured.

In embodiments of the present invention, the melt tension of the liquid crystal polyester is at least 5 mN, and is preferably at least 10 mN, and more preferably 20 mN or greater.

Further, the melt tension is preferably not more than 90 mN, more preferably not more than 80 mN, and particularly preferably 75 mN or less. If the melt tension of the liquid crystal polyester is less than 5 mN, then when the resin composition (melted resin) containing the supercritical fluid is foamed by reducing the pressure inside the mold, the gas bubbles are more likely to coalesce, meaning molded foam articles having a non-uniform foamed state are sometimes obtained. On the other hand, if the melt tension of the liquid crystal polyester exceeds 100 mN, then the injection pressure during injection molding may sometimes increase excessively, making molding impossible.

The above upper limit and lower limit values may be combined as desired.

In one aspect, the melt tension of the liquid crystal polyester according to the present invention is preferably at least 5 mN but not more than 90 mN more preferably at least 10 mN but not more than 80 mN, and particularly preferably at least 20 mN but not more than 75 mN.

In another aspect, the melt tension of the liquid crystal polyester according to the present invention may be at least 5 mN but not more than 71 mN, or at least 14 mN but not more than 71 mN.

Provided the melt tension falls within the above range, the foamed state inside the molded articles becomes more uniform. The melt tension may be adjusted by increasing the molecular weight of the liquid crystal polyester, or may be controlled by adjusting the amount of inorganic filler or the like that is added.

If a liquid crystal polyester having a melt tension within the above range is used, then when the supercritical fluid contained in the melted resin is subjected to a reduction in pressure and foaming inside the mold, coalescence of the gas bubbles is less likely to occur, and the bubbles can be more easily uniformly micronized, enabling molded foam articles having a uniform foamed state to be produced.

The liquid crystal polyester according to an embodiment of the present invention has repeating units represented by general formulas (1), (2) and (3) shown below.

$$—O—Ar^1—CO— \quad (1)$$

$$—CO—Ar^2—CO— \quad (2)$$

$$—X—Ar^3—Y— \quad (3)$$

(In the formulas, $Ar^1$ represents a phenylene group, naphthylene group or biphenylylene group; $Ar^2$ and $Ar^3$ each independently represent a phenylene group, naphthylene group, biphenylylene group, or a group represented by general formula (4) shown below; X and Y each independently represent an oxygen atom or an imino group; and at least one hydrogen atom in $Ar^1$, $Ar^2$ and $A^3$ may be independently substituted with a halogen atom, an alkyl group or an aryl group.)

$$—Ar^4—Z—Ar^5— \quad (4)$$

(In the formula, $Ar^4$ and $Ar^5$ each independently represent a phenylene group or a naphthylene group; and Z represents an oxygen atom, sulfur atom, carbonyl group, sulfonyl group or alkylidene group.)

In the above general formulas (1) to (3), examples of the halogen atom that may substitute at least one hydrogen atom in the group represented by $Ar^1$, $Ar^2$ or $Ar^3$ include a fluorine atom, chlorine atom, bromine atom and iodine atom.

In the above general formulas (1) to (3), the alkyl group that may substitute at least one hydrogen atom in the group represented by $Ar^1$, $Ar^2$ or $Ar^1$ is preferably an alkyl group of 1 to 10 carbon atoms, and examples include a methyl group, ethyl group, n-propyl group, isopropyl group, n-butyl group, isobutyl group, sec-butyl group, tert-butyl group, n-hexyl group, n-heptyl group, 2-ethylhexyl group, n-octyl group, n-nonyl group and n-decyl group.

In the above general formulas (1) to (3), the aryl group that may substitute at least one hydrogen atom in the group represented by $Ar^1$, $Ar^2$ or $Ar^3$ is preferably an aryl group of 6 to 20 carbon atoms, and examples include monocyclic aromatic groups such as a phenyl group, o-tolyl group, m-tolyl group and p-tolyl group, and condensed ring aromatic groups such as a 1-naphthyl group and 2-naphthyl group.

In the above general formulas (1) to (3), in those cases where at least one hydrogen atom in the group represented by $Ar^1$, $Ar^2$ or $Ar^3$ is substituted with one of these groups, the number of substituents in each group represented by $Ar^1$, $Ar^2$ or $A^3$ is, independently, preferably either 1 or 2, and is more preferably 1.

In the above general formula (4), the alkylidene group is preferably an alkylidene group of 1 to 10 carbon atoms, and examples include a methylene group, ethylidene group, isopropylidene group, n-butylidene group and 2-ethylhexylidene group.

The repeating unit represented by general formula (1) is preferably a repeating unit in which $Ar^1$ is a 1,4-phenylene group (for example, a repeating unit derived from p-hydroxybenzoic acid), a repeating unit in which $Ar^1$ is a 2,6-naphthylene group (for example, a repeating unit derived from 6-hydroxy-2-naphthoic acid), or a repeating unit in which $Ar^1$ is a 4,4'-biphenylylene group.

Examples of the monomer that forms the repeating unit represented by general formula (1) include 6-hydroxy-2-naphthoic acid, p-hydroxybenzoic acid and 4-(4-hydroxyphenyl)benzoic acid, as well as monomers in which a hydrogen atom on the benzene ring or naphthalene ring of one of these compounds has been substituted with a halogen atom, an alkyl group of 1 to 10 carbon atoms or an aryl group. Moreover, the monomer may also be used in the form of an ester-forming derivative described below.

The repeating unit represented by general formula (2) is preferably a repeating unit in which $Ar^2$ is a 1,4-phenylene group (for example, a repeating unit derived from terephthalic acid), a repeating unit in which $Ar^2$ is a 1,3-phenylene group (for example, a repeating unit derived from isophthalic acid), a repeating unit in which $Ar^2$ is a 2,6-naphthylene group (for example, a repeating unit derived from 2,6-naphthalenedicarboxylic acid), or a repeating unit in which $Ar^2$ is a diphenyl ether-4,4'-diyl group (for example, a repeating unit derived from diphenyl ether-4,4'-dicarboxylic acid), and is more preferably a repeating unit in which $Ar^2$ is a 1,4-phenylene group, a repeating unit in which $Ar^2$ is a 1,3-phenylene group, or a repeating unit in which $Ar^2$ is a 2,6-naphthylene group.

Examples of the monomer that forms the repeating unit represented by general formula (2) include 2,6-naphthalenedicarboxylic acid, terephthalic acid, isophthalic acid, and biphenyl-4,4'-dicarboxylic acid, as well as monomers in which a hydrogen atom on the benzene ring or naphthalene ring of one of these compounds has been substituted with a halogen atom, an alkyl group of 1 to 10 carbon atoms or an aryl group. Moreover, the monomer may also be used in the form of an ester-forming derivative described below.

The repeating unit represented by general formula (3) is preferably a repeating unit in which $Ar^3$ is a 1,4-phenylene group (for example, a repeating unit derived from hydroquinone, a repeating unit derived from p-aminophenol, or a repeating unit derived from p-phenylenedianine), or a repeating unit in which $Ar^3$ is a 4,4'-biphnylylene group (for example, a repeating unit derived from 4,4'-dihydroxybiphenyl, a repeating unit derived from 4-amino-4'-hydroxybiphenyl, or a repeating unit derived from 4,4'-diaminobiphenyl).

Examples of the monomer that forms the repeating unit represented by general formula (3) include 2,6-naphthol, hydroquinone, resorcin and 4,4'-dihydroxybiphenyl, as well as monomers in which a hydrogen atom on the benzene ring or naphthalene ring of one of these compounds has been substituted with a halogen atom, an alkyl group of 1 to 10 carbon atoms or an aryl group. Moreover, the monomer may also be used in the form of an ester-forming derivative described below.

In order to facilitate the polymerization in the process for producing the polyester, an ester-forming derivative is preferably used as the monomer for forming the repeating unit represented by formula (1), the repeating unit represented by formula (2) or the repeating unit represented by formula (3). This ester-forming derivative describes a monomer having the type of group that promotes an ester-producing reaction, and specific examples include highly reactive derivatives, including ester-forming derivatives in which the carboxylic acid group in a monomer molecule has been converted to an acid halide or an acid anhydride, and ester-forming derivatives in which the hydroxyl group in a monomer molecule has been converted to a lower carboxylate ester group.

The amount of the repeating unit (1) in the liquid crystal polyester, when the total amount of the repeating unit (1), the repeating unit (2) and the repeating unit (3) is deemed 100 mol %, is preferably at least 30 mol %, more preferably at least 30 mol % but not more than 80 mol %, even more preferably at least 40 mol % but not more than 70 mol %, and still more preferably at least 45 mol % but not more than 65 mol %.

The amount of the repeating unit (2) in the liquid crystal polyester, when the total amount of the repeating unit (1), the repeating unit (2) and the repeating unit (3) is deemed 100 mol %, is preferably not more than 35 mol %, more preferably at least 10 mol % but not more than 35 mol %, even more preferably at least 15 mol % but not more than 30 mol %, and still more preferably at least 17.5 mol % but not more than 27.5 mol %.

The amount of the repeating unit (3) in the liquid crystal polyester, when the total amount of the repeating unit (1), the repeating unit (2) and the repeating unit (3) is deemed 100 mol %, is preferably not more than 35 mol %, more preferably at least 10 mol % but not more than 35 mol %, even more preferably at least 15 mol % but not more than 30 mol %, and still more preferably at least 17.5 mol % but not more than 27.5 mol %.

In other words, when the total amount of the repeating unit (1), the repeating unit (2) and the repeating unit (3) in the liquid crystal polyester is deemed 100 mol %, it is preferable that the amount of the repeating unit (1) is at least 30 mol % but not more than 80 mol %, the amount of the repeating unit (2) is at least 10 mol % but not more than 35 mol %, and the amount of the repeating unit (3) is at least 10 mol % but not more than 35 mol %.

Provided the liquid crystal polyester includes an amount of the repeating unit (1) that falls within the above range, the melt fluidity, the heat resistance, and the strength and rigidity can be more easily improved.

The liquid crystal polyester may have only one type of each of the repeating units (1) to (3), or may have two or more types of one or more of the repeating units. Further, the liquid crystal polyester may also have one, or two or more, other repeating units besides the repeating units (1) to (3), but the amount of these other repeating units, when the total amount of all the repeating units is deemed to be 100 mol %, is preferably at least 0 mol % but not more than 10 mol %, and more preferably at least 0 mol % but not more than 5 mol %.

In terms of facilitating a lowering of the melt viscosity, the liquid crystal polyester preferably has, as the repeating unit (3), a repeating unit in which X and Y are both oxygen atoms, namely a repeating unit derived from a prescribed aromatic diol, and it is more preferable that the liquid crystal polyester has only repeating units in which X and Y are both oxygen atoms as the repeating unit (3).

The liquid crystal polyester is preferably produced by conducting a melt polymerization of the raw material monomers corresponding with the repeating units that constitute the liquid crystal polyester, and subjecting the thus obtained polymer (prepolymer) to a solid phase polymerization. This enables a high-molecular weight liquid crystal polyester having superior heat resistance, strength and rigidity to be produced with good operability. The melt polymerization may be performed in the presence of a catalyst, and examples of the catalyst include metal compounds such as magnesium acetate, stannous acetate, tetrabutyl titanate, lead acetate, sodium acetate, potassium acetate and antimony trioxide, and nitrogen-containing heterocyclic compounds such as N,N-dimethylaminopyridine and 1-methylimidazole, with a nitrogen-containing heterocyclic compound being preferable.

The flow start temperature of the liquid crystal polyester is preferably at least 270° C., more preferably at least 270° C. but not more than 400° C., and even more preferably at least 280° C. but not more than 380° C. The higher the flow start temperature of the liquid crystal polyester, the more easily the heat resistance and the strength, rigidity and impact resistance can be improved, but if the flow start temperature is too high, then a high temperature is required to melt the polyester, thermal degradation during molding becomes more likely, and the viscosity upon melting tends to increase, causing a deterioration in fluidity. In one aspect, provided the flow start temperature of the liquid crystal polyester falls within the above range, the heat resistance, and the strength, rigidity and impact resistance of the obtained molded articles can be improved, thermal degradation during molding becomes less likely, and a suitable viscosity and fluidity are achieved upon melting.

A single type of liquid crystal polyester may be used alone, or a combination of two or more types may be used.

In one aspect, the amount of the liquid crystal polyester according to the present invention, relative to the total mass of the resin composition, is preferably greater than 30% by mass but not more than 100% by mass, more preferably at least 40% by mass but not more than 90% by mass, and particularly preferably at least 50% by mass but not more than 80% by mass.

(Inorganic Filler)

Examples of inorganic fillers include ceramic fibers such as glass fiber, silica fiber and alumina fiber, silica-alumina fiber, metal fibers such as stainless steel fiber, as well as talc, mica, flake graphite, wollastonite, barium sulfate and calcium carbonate. Examples of the glass fiber include fibers produced by various methods, such as chopped glass fiber and milled glass fiber. The mica may be muscovite, phlogopite, fluorphlogopite or tetrasilicic mica. The flake graphite may be natural flake graphite or synthetic flake graphite.

In an embodiment of the present invention, the inorganic filler is preferably glass fiber.

The number average fiber length of the glass fiber following melt-kneading is preferably at least 50 µm but not more than 500 µm. Further, the number average fiber diameter of the glass fiber following melt-kneading is preferably at least 6 µm but not more than 18 µm.

In this description, the number average fiber length and the number average fiber diameter of the glass fiber following melt-kneading can be measured by electron microscope observation.

A single type of glass fiber may be used alone, or a combination of two or more types may be used.

In an embodiment of the present invention, the blend amount of the inorganic filler, per 100 parts by mass of the liquid crystal polyester, is preferably greater than 0 parts by mass but not more than 100 parts by mass, more preferably at least 10 parts by mass but not more than 90 parts by mass, and particularly preferably at least 20 parts by mass but not more than 80 parts by mass.

(Other Components)

The resin composition according to an embodiment of the present invention may also contain other components that do not correspond with either the liquid crystal polyester or the inorganic filler, provided these other components do not impair the effects of the present invention.

Examples of these other components include fillers other than the inorganic filler (hereinafter sometimes referred to as "other fillers"), additives, and resins besides the liquid crystal polyester (hereinafter sometimes referred to as "other resins").

A single type of these other components may be used alone, or a combination of two or more types may be used.

In those cases where the resin composition according to an embodiment of the present invention contains another filler, the amount of the other filler is preferably greater than 0 parts by mass but not more than 100 parts by mass per 100 parts by mass of the liquid crystal polyester.

Examples of the additives include antioxidants, heat stabilizers, ultraviolet absorbers, antistatic agents, surfactants, flame retardants and colorants.

In those cases where the resin composition according to an embodiment of the present invention contains an additive, the amount of the additive is preferably greater than 0 parts by mass but not more than 5 parts by mass per 100 parts by mass of the total mass of the liquid crystal polyester and the inorganic filler.

Examples of the other resins include thermoplastic resins such as polyethersulfones, polyetherimides, polysulfones, polyarylates, polyamides, polyesters, polyphenylene sulfides, polyetherketones and modified polyphenylene ethers, and combinations of two or more types of these resins may also be used.

In those cases where the resin composition according to an embodiment of the present invention contains another resin, the amount of the other resin is preferably greater than 0 parts by mass but not more than 100 parts by mass per 100 parts by mass of the liquid crystal polyester.

The resin composition according to an embodiment of the present invention preferably has a viscosity at a temperature 20° C. higher than the flow start temperature that is at least 200 Pa·s but not more than 5,000 Pa·s. Provided the viscosity of the resin composition falls within the above range, the foamed state inside the molded articles becomes more uniform. If the viscosity of the resin composition at a temperature 20° C. higher than the flow start temperature is less than 200 Pa·s, then when the melted resin obtained by melt-kneading the resin composition containing the supercritical fluid is subjected to a reduction in pressure and foaming inside the mold, coalescence of the gas bubbles is more likely to occur, and molded foam articles having a non-uniform foamed state can sometimes occur. On the other hand, if the viscosity of the resin composition at a temperature 20° C. higher than the flow start temperature exceeds 5,000 Pa·s, then the viscosity of the resin composition is overly high, which can sometimes make foaming impossible, meaning molded foam articles cannot be obtained.

In one aspect, the viscosity of the resin composition at a temperature 20° C. higher than the flow start temperature may be at least 230 Pa·s but not more than 4,000 Pa·s, or at least 1,600 Pa·s but not more than 4,000 Pa·s.

The resin composition can be produced by mixing the liquid crystal polyester, the inorganic filler and any other desired components, either in a single batch or in an appropriate order.

The resin composition is preferably pelletized by using an extruder to perform melt-kneading of the liquid crystal polyester, the inorganic filler, and any other desired components.

The extruder is preferably a device having a cylinder, one or more screws disposed inside the cylinder, and one or more supply ports provided on the cylinder, and is more preferably a device that also has one or more vents provided in the cylinder.

<Molded Foam Article Molded from Resin Composition>

One embodiment of the present invention is a molded foam article that is foam molded from a foaming material and a resin composition, wherein the resin composition comprises a liquid crystal polyester having a repeating unit represented by general formula (1) shown below, a repeating unit represented by general formula (2) shown below and a repeating unit represented by general formula (3) shown below, and also comprises an inorganic filler, the amount of the inorganic filler exceeds 0 parts by mass but is not more than 100 parts by mass per 100 parts by mass of the liquid crystal polyester, the resin composition has a viscosity at a temperature 20° C. higher than the flow start temperature of the resin composition of at least 200 Pa·s but not more than 5,000 Pa·s, and the liquid crystal polyester has a melt tension at a temperature 20° C. higher than the flow start temperature of the liquid crystal polyester of at least 5 mN but not more than 100 mN.

$$—O—Ar^1—CO— \quad (1)$$

$$—CO—Ar^2—CO— \quad (2)$$

$$—X—Ar^3—Y— \quad (3)$$

(In the formulas, $Ar^1$ represents a phenylene group, naphthylene group or biphenylylene group; $Ar^2$ and $A^3$ each independently represent a phenylene group, naphthylene group, biphenylylene group, or a group represented by general formula (4) shown below; X and Y each independently represent an oxygen atom or an imino group; and at least one hydrogen atom in $Ar^1$, $Ar^2$ and $Ar^3$ may be independently substituted with a halogen atom, an alkyl group or an aryl group.)

$$—Ar^4—Z—Ar^5— \quad (4)$$

(In the formula, $Ar^4$ and $Ar^5$ each independently represent a phenylene group or a naphthylene group; and Z represents an oxygen atom, sulfur atom, carbonyl group, sulfonyl group or alkylidene group.)

The molded foam article of an embodiment of the present invention preferably has a thin-wall portion with a thickness of 4.0 mm or less.

The molded foam article of an embodiment of the present invention has a thickness that is preferably not more than 4.0 mm, more preferably not more than 3.5 mm, and particularly preferably 3.0 mm or less.

An example of the lower limit for the thickness is at least 0.1 mm, preferably at least 0.3 mm, and particularly preferably 0.5 m or greater. Provided the thickness is at least as large as the above lower limit, the molded article can be more easily foamed before cooling and solidification of the resin in the mold. As a result, the weight of the molded article can be adequately reduced.

The molded foam article of an embodiment of the present invention may be a molded foam article having a thin-wall portion with a thickness of 4.0 mm or less and a thick-wall portion with a thickness exceeding 4.0 mm, or may be a molded foam article in which the thickness of the maximum thickness portion is 4.0 mm or less.

In this description, the "thickness" of the molded foam article can be measured with a micrometer.

A "thin-wall portion" means a region in which the thickness of the molded foam article is at least 0.1 mm but not more than 4 mm.

A "thick-wall portion" means a region in which the thickness of the molded foam article is greater than 4 mm but not more than 30 mm.

The "maximum thickness portion" means the region in which the thickness of the molded foam article is greatest.

As a result of intensive investigation, the inventors of the present invention discovered that in molded foam articles of embodiments of the present invention, the strength was particularly superior when the thickness of the articles was reduced. To provide an example, when molded foam articles formed from liquid crystal polyesters having similar amounts of weight reduction are compared, the more the thickness of the molded foam article is reduced, the greater the improvement in the strength retention ratio of the average flexural strength of the molded foam article between before and after the thickness reduction. In solid molded articles formed from liquid crystal polyesters, it is known that because the molecular orientation of the skin layer is superior to the molecular orientation of the core layer, the strength layer of the skin layer itself has an effect on the strength of the overall solid molded article. On the other hand, in molded foam articles formed from liquid crystal polyesters, it is surmised that as the thickness of the molded article is reduced, the effect that the strength of the skin layer has on the strength of the overall molded foam article is even greater than that observed in solid molded articles.

Examples of components formed from molded foam articles of embodiments of the present invention include bobbins such as optical pickup bobbins and transformer bobbins; relay components such as relay cases, relay bases, relay sprues and relay armatures; connectors such as RIMM, DDR and CPU sockets, as well as S/O, DIMM and Board to Board connectors, FPC connectors and card connectors; reflectors such as lamp reflectors and LED reflectors; holders such as lamp holders and heater holders; diaphragms such as speaker diaphragms; separation claws such as separation claws for copiers and separation claws for printers; camera module components; switch components; motor components; sensor components; hard disk drive components; tableware such as ovenware; vehicle components (including instrument panels, door trims, roofs, aero parts, and other structural members); aircraft components; and sealing members such as sealing members for semiconductor elements and sealing members for coils.

In one aspect, a method for producing molded foam articles according to an embodiment of the present invention, which molds molded foam articles continuously, comprises:

repeating at least twice the following step 1, step 2, step 3 and step 4 in this order; wherein step 1 comprises melting a resin composition that includes a liquid crystal polyester;

step 2 comprises introducing, with an introduction device, a supercritical fluid which, in a supercritical state and in an amount of at least 0.1 parts by mass but not more than 0.3 parts by mass per 100 parts by mass of the liquid crystal polyester, is unreactive with the liquid crystal polyester and which is a gas at normal temperature and normal pressure, into the resin composition in an amount of at least 0.1 parts by mass but not more than 0.3 parts by mass per 100 parts by mass of the liquid crystal polyester, and then melt-kneading the resultant mixture;

step 3 comprises injecting the melt-kneaded resin composition containing the supercritical fluid into a mold;

step 4 comprises conducting foaming by lowering at least one of the pressure and the temperature of the supercritical fluid contained in the resin composition to a value below the critical point of the supercritical fluid, thereby producing a molded foam article;

the liquid crystal polyester is a liquid crystal polyester composed of a repeating unit (1) in which the abovementioned $Ar^1$ is a 2,6-naphthylene group, a repeating unit (2) in which the abovementioned $Ar^2$ is a 2,6-naphthylene group, a repeating unit (2) in which the abovementioned $Ar^2$ is a 1,4-phenylene group, and a repeating unit (3) in which the abovementioned $Ar^3$ is a 1,4-phenylene group, or a liquid crystal polyester composed of a repeating unit (1) in which the abovementioned $Ar^1$ is a 1,4-phenylene group, a repeating unit (2) in which the abovementioned $Ar^2$ is a 1,4-phenylene group, a repeating unit (2) in which the abovementioned $Ar^1$ is a 1,3-phenylene group, and a repeating unit (3) in which the abovementioned $Ar^3$ is a 4,4'-biphenylylene group, and when the total amount of the repeating unit (1), the repeating unit (2) and the repeating unit (3) is deemed 100 mol %, the amount of the repeating unit (1) is at least 30 mol % but not more than 80 mol %, the amount of the repeating unit (2) is at least 10 mol % but not more than 35 mol %, and the amount of the repeating unit (3) is at least 10 mol % but not more than 35 mol %;

the liquid crystal polyester has a melt tension at a temperature 20° C. higher than the flow start temperature of at least 5 mN but not more than 100 mN (preferably at least 5 mN but not more than 71 mN, and more preferably at least 14 mN but not more than 71 mN); and the viscosity of the resin composition at a temperature 20° C. higher than the flow start temperature of the resin composition is at least 200 Pa·s but not more than 5,000 Pa·s (preferably at least 230 Pa·s but not more than 4,000 Pa·s, and more preferably at least 1,600 Pa·s but not more than 4,000 Pas).

EXAMPLES

The present invention is described below in further detail using a series of examples, but the present invention is in no way limited by the following examples.

(Melt Tension of Neat LCP)

For the liquid crystal polyester contained in the resin composition, a capillary rheometer was used to extrude the liquid crystal polyester, at a temperature 20° C. higher than the flow start temperature of the liquid crystal polyester contained in the composition, from a nozzle having an internal diameter of 1 mm and a length of 10 mm, by lowering a piston (ø10 mm) at a rate of 10 mm/minute, and the melt tension was measured (units: mN).

(Melt Viscosity of Resin Composition)

Using a parallel plate rheometer, the resin composition was melted at a temperature 80° C. higher than the flow start temperature of the resin composition, the melt viscosity of the resin composition was measured while the temperature was lowered at a rate of 5° C. per minute using a temperature reduction method, and the melt viscosity at a temperature 20° C. higher than the flow start temperature of the resin composition was measured (units: Pa·s).

(Voids)

Voids are deemed to be cavities having a size of at least 0.1 mm$^3$ inside a molded foam article.

(Void Ratio)

The void ratio is the ratio (volumetric fraction) of the total volume of the abovementioned voids inside the molded foam article relative to the volume of the molded foam article, and was determined using a molded foam article of 150 mm×150 mm×thickness 2.4 mm, by using a three-dimensional X-ray CT system (TOSCANER 32300 µFD, manufactured by Toshiba Corporation) to measure the void ratio inside the molded article, and then calculating the void ratio using analysis software VG STUDIO MAX. Because the shape of the molded articles was the uniform shape described above, a smaller average weight for the obtained molded article indicates improved weight reduction by foaming.

(Foamed State Inside Molded Article)

The foamed state inside a molded article was evaluated against the following criteria.

A: when the void ratio is less than 0.5%
B: when the void ratio is at least 0.5% but less than 1.0%
C: when the void ratio is at least 1.0% but less than 1.5%
D: when the void ratio is 1.5% or greater (Average Mass of Molded Article)

The weight of each of 30 molded foam articles having dimensions of 150 mm×150 mm×thickness 2.4 mm, or 250 mm×360 mm×thickness 3 mm, was measured, and the average weight was calculated.

(Standard Deviation of Molded Article)

Using the above average weight of the molded article, the standard deviation was calculated using the following formula.

$$s = \sqrt{\frac{1}{n}\sum_{i=1}^{n}(x_i - \bar{x})^2}$$ [Numerical formula 1]

n: total number of data
$x_i$: weight of individual molded article
x: average weight of molded articles (Evaluation of Fluctuation in Molded Article Weight)

The fluctuation in the molded article weight was evaluated against the following criteria.

A: when the standard deviation of the molded article weight is less than 0.15%
B: when the standard deviation of the molded article weight is at least 0.15% but less than 0.25%
C: when the standard deviation of the molded article weight is at least 0.25% but less than 0.35%
D: when the standard deviation of the molded article weight is 0.35% or greater (Naming of Unfoamed Molded Articles)

In contrast to a molded foam article, an unfoamed molded article produced using a production method in which a supercritical fluid is not injected during molding and no foaming occurs is defined a "solid molded article".

(Average Flexural Strength of Molded Article)

The average flexural strength of each of the solid molded articles disclosed in Examples 10 to 17 was determined using test pieces (MD direction: 140 mm×TD direction: 10 mm) prepared by cutting 140 mm along the resin flow direction (hereinafter also referred to as the MD direction) and 10 mm along the direction perpendicular to the flow direction (hereinafter also referred to as the TD direction) from the central portion of a solid molded article of 150 mm×150 mm×thickness 3 mm, or 150 mm×150 mm×thickness 4 mm, by conducting measurements in accordance with ISO 178 using an n value of 3, and then calculating the average value.

The average flexural strength of the solid molded article disclosed in Comparative Example 6 was determined using solid molded articles formed as ISO 3167 A-type dumbbell test pieces (shape of parallel portion: 80 mm×10 mm×thickness 4 mm), by conducting measurements in accordance with ISO 178 using an n value of 3, and then calculating the average value.

The average flexural strength of each of the molded foam articles disclosed in Examples 18 to 25 and Comparative Examples 7 and 8 was determined using test pieces prepared by cutting a shape of 140 mm along the MD direction×10 mm along the TD direction from the central portion of a molded foam article of 150 mm×150 mm×thickness 3 mm, or 150 mm×150 mm×thickness 4 mm, by conducting measurements in accordance with ISO 178 using an n value of 3, and then calculating the average value.

(Measurement of Specific Gravity of Molded Article)

The specific gravity of each solid molded article and molded foam article was measured using the same shaped test pieces as the test pieces used for measurement of the average flexural strength, by measuring the weight and volume using an n value of 3, determining the average value for both the weight and the volume, and then calculating the specific gravity using the following formula.

Specific gravity of molded article=(weight of test piece)/(volume of test piece)

(Weight Reduction Ratio for Molded Foam Article)

The weight reduction ratio for each molded foam article was calculated from the specific gravity of the molded foam article and the specific gravity of the solid molded article using the following formula.

Weight reduction ratio for molded foam article=(specific gravity of solid molded article−specific gravity of molded foam article)/(specific gravity of solid molded article)×100

(Strength Retention Ratio for Average Flexural Strength of Molded Foam Article)

The strength retention ratio for the average flexural strength of the molded foam article was calculated from the average flexural strength of the solid molded article and the average flexural strength of the molded foam article using the following formula.

Strength retention ratio for average flexural strength of molded foam article=(average flexural strength of molded foam article)/(average flexural strength of solid molded article)×100

(Ratio of Strength Retention Ratio for Average Flexural Strength Relative to Weight Reduction Ratio for Molded Foam Article (Ratio A))

The ratio of the strength retention ratio for the average flexural strength relative to the weight reduction ratio for the molded foam article was deemed "ratio A". The ratio A was calculated using the following formula.

Ratio A=(100−strength retention ratio for average flexural strength of molded foam article (%))/(weight reduction ratio for molded foam article (%))

(Difference in Ratio A Between Molded Foam Article of Thickness 4 mm and Molded Foam Article of Thickness 3 mm)

The difference in the ratio A between a molded foam article of thickness 4 mm and a molded foam article of thickness 3 mm was calculated using the following formula.

Difference in ratio A between molded foam article of thickness 4 mm and molded foam article of thickness 3 mm=(ratio A for molded foam article of thickness 4 mm)−(ratio A for molded foam article of thickness 3 mm)

(Evaluation of Size of Difference in Ratio A between Molded Foam Article of Thickness 4 mm and Molded Foam Article of Thickness 3 mm)

The size of the difference in the ratio A values was evaluated against the following criteria.

A: when the difference in ratio A values is at least 0.02

B: when the difference in ratio A values is at least 0.00 but less than 0.02

C: when the difference in ratio A values is less than 0.00.

Production Example 1

Production Method for LCP1

A reactor fitted with a stirring device, a torque meter, a nitrogen gas inlet tube, a thermometer and a reflux condenser was charged with 6-hydroxy-2-naphthoic acid (1,034.99 g, 5.5 mol), 2,6-naphthalenedicarboxylic acid (378.33 g, 1.75 mol), terephthalic acid (83.07 g, 0.5 mol), hydroquinone (272.52 g, 2.475 mol, a 0.225 molar excess relative to the total amount of 2,6-naphthalenedicarboxylic acid and terephthalic acid), acetic anhydride (1,226.87 g, 12 mol), and 1-methylimidazole (0.17 g) as a catalyst, and following replacement of the gas inside the reactor with nitrogen gas, the temperature was raised from room temperature to 145° C. over a period of 15 minutes while stirring the contents under a stream of nitrogen gas, and the mixture was then refluxed at 145° C. for one hour. Subsequently, the temperature was raised from 145° C. to 310° C. over a period of 3.5 hours, while by-product acetic acid and unreacted acetic anhydride were removed by distillation, and after holding the temperature at 310° C. for 3 hours, the contents were extracted and cooled to room temperature.

The obtained solid matter was ground to a particle size of about 0.1 to 1 mm using a grinder, thus obtaining a powdered prepolymer. Subsequently, this prepolymer was subjected to a solid phase polymerization by heating, under an atmosphere of nitrogen, from room temperature to 250° C. over a period of one hour and then from 250° C. to 310° C. over a period of 10 hours, and then holding the temperature at 300° C. for 6 hours. Following the solid phase polymerization, the product was cooled to obtain a powdered liquid crystal polyester. The flow start temperature of this liquid crystal polyester was 303° C. The liquid crystal polyester obtained in this manner was termed LCP1.

If the total amount of all the repeating units that constitute LCP1 is deemed 100 mol %, then LCP1 had 55 mol % of a repeating unit (1) in which $Ar^1$ was a 2,6-naphthylene group, 17.5 mol % of a repeating unit (2) in which $Ar^1$ was a 2,6-naphthylene group, 5 mol % of a repeating unit (2) in which $Ar^2$ was a 1,4-phenylene group, and 22.5 mol % of a repeating unit (3) in which $Ar^1$ was a 1,4-phenylene group.

Production Example 2

Production Method for LCP2

A reactor fitted with a stirring device, a torque meter, a nitrogen gas inlet tube, a thermometer and a reflux condenser was charged with 6-hydroxy-2-naphthoic acid (1,034.99 g, 5.5 mol), 2,6-naphthalenedicarboxylic acid (378.33 g, 1.75 mol), terephthalic acid (83.07 g, 0.5 mol), hydroquinone (272.52 g, 2.475 mol, a 0.225 molar excess relative to the total amount of 2,6-naphthalenedicarboxylic acid and terephthalic acid), acetic anhydride (1,226.87 g, 12 mol), and 1-methylimidazole (0.17 g) as a catalyst, and following replacement of the gas inside the reactor with nitrogen gas, the temperature was raised from room temperature to 145° C. over a period of 15 minutes while stirring the contents under a stream of nitrogen gas, and the mixture was then refluxed at 145° C. for one hour. Subsequently, the temperature was raised from 145° C. to 310° C. over a period of 3.5 hours, while by-product acetic acid and unreacted acetic anhydride were removed by distillation, and after holding the temperature at 310° C. for 3 hours, the contents were extracted and cooled to room temperature.

The obtained solid matter was ground to a particle size of about 0.1 to 1 mm using a grinder, thus obtaining a powdered prepolymer. Subsequently, this prepolymer was subjected to a solid phase polymerization by heating, under an atmosphere of nitrogen, from room temperature to 250° C. over a period of one hour and then from 250° C. to 310° C. over a period of 10 hours, and then holding the temperature at 310° C. for 6 hours. Following the solid phase polymerization, the product was cooled to obtain a powdered liquid crystal polyester. The flow start temperature of this liquid crystal polyester was 324° C. The liquid crystal polyester obtained in this manner was termed LCP2.

If the total amount of all the repeating units that constitute LCP2 is deemed 100 mol %, then LCP2 had 55 mol % of a repeating unit (1) in which $Ar^1$ was a 2,6-naphthylene group, 17.5 mol % of a repeating unit (2) in which $Ar^2$ was a 2,6-naphthylene group, 5 mol % of a repeating unit (2) in which $Ar^2$ was a 1,4-phenylene group, and 22.5 mol % of a repeating unit (3) in which $Ar^3$ was a 1,4-phenylene group.

Production Example 3

Production Method for LCP3

A reactor fitted with a stirring device, a torque meter, a nitrogen gas inlet tube, a thermometer and a reflux condenser was charged with 6-hydroxy-2-naphthoic acid (1,034.99 g, 5.5 mol), 2,6-naphthalenedicarboxylic acid (378.33 g, 1.75 mol), terephthalic acid (83.07 g, 0.5 mol), hydroquinone (272.52 g, 2.475 mol, a 0.225 molar excess relative to the total amount of 2,6-naphthalenedicarboxylic acid and terephthalic acid), acetic anhydride (1,226.87 g, 12 mol), and 1-methylimidazole (0.17 g) as a catalyst, and following replacement of the gas inside the reactor with nitrogen gas, the temperature was raised from room temperature to 145° C. over a period of 15 minutes while stirring the contents under a stream of nitrogen gas, and the mixture was then refluxed at 145° C. for one hour. Subsequently, the temperature was raised from 145° C. to 310° C. over a period of 3.5 hours, while by-product acetic acid and unreacted acetic anhydride were removed by distillation, and after holding the temperature at 310° C. for 3 hours, the contents were extracted and cooled to room temperature.

The obtained solid matter was ground to a particle size of about 0.1 to 1 mm using a grinder, thus obtaining a powdered prepolymer. Subsequently, this prepolymer was subjected to a solid phase polymerization by heating, under an atmosphere of nitrogen, from room temperature to 250° C. over a period of one hour and then from 250° C. to 310° C. over a period of 10 hours, and then holding the temperature at 310° C. for 10 hours. Following the solid phase polymerization, the product was cooled to obtain a powdered liquid crystal polyester. The flow start temperature of this liquid crystal polyester was 334° C. The liquid crystal polyester obtained in this manner was termed LCP3.

If the total amount of all the repeating units that constitute LCP3 is deemed 100 mol %, then LCP3 had 55 mol % of a repeating unit (1) in which $Ar^1$ was a 2,6-naphthylene group, 17.5 mol % of a repeating unit (2) in which $Ar^2$ was a 2,6-naphthylene group, 5 mol % of a repeating unit (2) in which $Ar^2$ was a 1,4-phenylene group, and 22.5 mol % of a repeating unit (3) in which $Ar^3$ was a 1,4-phenylene group.

Production Example 4

Production Method for LCP4

A reactor fitted with a stirring device, a torque meter, a nitrogen gas inlet tube, a thermometer and a reflux condenser was charged with p-hydroxybenzoic acid (994.5 g, 7.2 mol), terephthalic acid (299.1 g, 1.8 mol), isophthalic acid (99.7 g, 0.6 mol), 4,4'-dihydroxybiphenyl (446.9 g, 2.4 mol), acetic anhydride (1,347.6 g, 13.2 mol), and 1-methylimidazole (0.194 g), the temperature was raised from room temperature to 150° C. over a period of 30 minutes while the contents were stirred under a stream of nitrogen gas, and the mixture was then refluxed at 150° C. for one hour. Subsequently, a further 0.9 g of 1-methylimidazole was added, the temperature was raised to 320° C. over a period of 2 hours and 50 minutes while by-product acetic acid and unreacted acetic anhydride were removed by distillation, the temperature was then held at 320° C. until an increase in torque was noticed, and the contents were then extracted from the reactor and cooled to room temperature.

The obtained solid matter was ground to a particle size of about 0.1 to 1 mm using a grinder, thus obtaining a powdered prepolymer. Subsequently, this prepolymer was subjected to a solid phase polymerization by heating, under an atmosphere of nitrogen, from room temperature to 250° C. over a period of one hour and then from 250° C. to 285° C. over a period of 5 hours, and then holding the temperature at 285° C. for 3 hours. Following the solid phase polymerization, the product was cooled to obtain a powdered liquid crystal polyester. The flow start temperature of this liquid crystal polyester was 327° C. The liquid crystal polyester obtained in this manner was termed LCP4.

If the total amount of all the repeating units that constitute LCP4 is deemed 100 mol %, then LCP4 had 60 mol % of a repeating unit (1) in which $Ar^1$ was a 1,4-phenylene group, 15 mol % of a repeating unit (2) in which $Ar^2$ was a 1,4-phenylene group, 5 mol % of a repeating unit (2) in which $Ar^2$ was a 1,3-phenylene group and 20 mol % of a repeating unit (3) in which $Ar^3$ was a 4,4'-biphenylylene group.

Production Example 5

Production Method for LCP5

A reactor fitted with a stirring device, a torque meter, a nitrogen gas inlet tube, a thermometer and a reflux condenser was charged with p-hydroxybenzoic acid (994.5 g, 7.2 mol), terephthalic acid (299.1 g, 1.8 mol), isophthalic acid (99.7 g, 0.6 mol), 4,4'-dihydroxybiphenyl (446.9 g, 2.4 mol), acetic anhydride (1,347.6 g, 13.2 mol), and 1-methylimidazole (0.194 g) as a catalyst, the resultant mixture was stirred at room temperature for 15 minutes while the inside of the reactor was flushed thoroughly with nitrogen gas, and the temperature was then raised under continuous stirring. Once the internal temperature reached 145° C., stirring was continued at the same temperature for one hour. Subsequently, the temperature was further raised over a period of 2 hours and 50 minutes while by-product acetic acid and unreacted acetic anhydride were removed by distillation, the temperature was then held at 320° C. until an increase in torque was noticed, and the contents were then extracted from the reactor and cooled to room temperature.

The obtained solid matter was ground to a particle size of about 0.1 to 1 mm using a grinder, thus obtaining a powdered prepolymer. Subsequently, this prepolymer was subjected to a solid phase polymerization by heating, under an atmosphere of nitrogen, from room temperature to 250° C. over a period of one hour and then from 250° C. to 285° C. over a period of 5 hours, and then holding the temperature at 285° C. for 3 hours. Following the solid phase polymerization, the product was cooled to obtain a powdered liquid crystal polyester. The flow start temperature of this liquid crystal polyester was 327° C. The liquid crystal polyester obtained in this manner was termed LCP5.

If the total amount of all the repeating units that constitute LCP5 is deemed 100 mol %, then LCP5 had 60 mol % of a repeating unit (1) in which $Ar^1$ was a 1,4-phenylene group, 15 mol % of a repeating unit (2) in which $Ar^2$ was a 1,4-phenylene group, 5 mol % of a repeating unit (2) in which $Ar^2$ was a 1,3-phenylene group and 20 mol % of a repeating unit (3) in which $Ar^3$ was a 4,4'-biphenylylene group.

Production Example 6

Production Method for LCP6

A reactor fitted with a stirring device, a torque meter, a nitrogen gas inlet tube, a thermometer and a reflux condenser was charged with p-hydroxybenzoic acid (994.5 g, 7.2 mol), 4,4'-dihydroxybiphenyl (446.9 g, 2.4 mol), terephthalic acid (358.8 g, 2.16 mol), isophthalic acid (39.9 g, 0.24 mol), acetic anhydride (1,347.6 g, 13.2 mol), and 1-methylimidazole (0.194 g) as a catalyst, the resultant mixture was stirred at room temperature for 15 minutes while the inside of the reactor was flushed thoroughly with nitrogen gas, and the temperature was then raised under continuous stirring. Once the internal temperature reached 145° C., stirring was continued at the same temperature for one hour. Subsequently, the temperature was further raised over a period of 2 hours and 50 minutes while by-product acetic acid and unreacted acetic anhydride were removed by distillation, the temperature was then held at 320° C. until an increase in torque was noticed, and the contents were then extracted from the reactor and cooled to room temperature.

The obtained solid matter was ground to a particle size of about 0.1 to 1 mm using a grinder, thus obtaining a powdered prepolymer. Subsequently, this prepolymer was subjected to a polymerization in the solid phase by heating, under an atmosphere of nitrogen, from room temperature to 250° C. over a period of one hour and then from 250° C. to 300° C. over a period of 5 hours, and then holding the temperature at 300° C. for 3 hours. The flow start temperature of the thus obtained polyester was 361° C. The liquid crystal polyester obtained in this manner was termed LCP3.

If the total amount of all the repeating units that constitute LCP6 is deemed 100 mol %, then LCP6 had 60 mol % of a repeating unit (1) in which $Ar^1$ was a 1,4-phenylene group, 18 mol % of a repeating unit (2) in which $Ar^2$ was a 1,4-phenylene group, 2 mol % of a repeating unit (2) in which $Ar^1$ was a 1,3-phenylene group and 20 mol % of a repeating unit (3) in which $Ar^3$ was a 4,4'-biphenylylene group.

Production of Resin Compositions, Examples 1 to 9, Comparative Examples 1 to 5

Examples 1, 2, 4, 5

The abovementioned LCP2, LCP4 or LCP5 was mixed as a liquid crystal resin under the conditions shown in Table 1. Specifically, using a twin-screw extruder (PCM-30HS manufactured by Ikegai, Ltd.) and a water-sealed vacuum pump (SW-25 manufactured by Shinko Seiki Co., Ltd.), the resin component was fed into the extruder from a feeder with the cylinder temperature set to 340° C., and was subjected to melt-kneading by the screws with an inserted kneading block, while degassing was conducted through a vacuum vent. The discharged strand was cut to obtain pellets of the resin composition.

Using a fully electric molding machine J110AD-180H manufactured by The Japan Steel Works, Ltd., and a supercritical fluid production unit having a feedback control function for the amount introduced of the supercritical fluid (SCF SYSTEM T-100J, manufactured by Trexel, Inc., recorded as "Device B" in Table 1), the resin composition of the pellets produced using the above method was heated and metered inside the cylinder with the temperature set to 360° C., while nitrogen in a supercritical state was introduced under the conditions shown in Table 1. The melted resin containing the dissolved supercritical fluid was injected at a temperature setting of 120° C. into a mold having a cavity shape of 150 mm×150 mm×thickness 1.2 mm, and the core-back method was used to obtain a molded foam body having a flat shape (150 mm×150 mm×thickness 2.4 mm).

Comparative Example 1

The abovementioned LCP5 was mixed as a liquid crystal resin under the conditions shown in Table 1. Specifically, using a twin-screw extruder (PCM-30HS manufactured by Ikegai, Ltd.) and a water-sealed vacuum pump (SW-25 manufactured by Shinko Seiki Co., Ltd.), the resin component was fed into the extruder from a feeder with the cylinder temperature set to 340° C., and was subjected to melt-kneading by the screws with an inserted kneading block, while degassing was conducted through a vacuum vent. The discharged strand was cut to obtain pellets of the resin composition.

Using a fully electric molding machine J450AD manufactured by The Japan Steel Works, Ltd., and a supercritical fluid production unit that did not have a feedback control function for the amount introduced of the supercritical fluid (SCF SYSTEM SI TRJ-30-A, manufactured by Trexel, Inc., recorded as "Device A" in Table 1), the resin composition of the pellets produced using the above method was heated and metered inside the cylinder with the temperature set to 360° C., while nitrogen in a supercritical state (a supercritical fluid) was introduced under the conditions shown in Table 1. The melted resin containing the dissolved supercritical fluid was injected at a temperature setting of 120° C. into a mold having a cavity shape of 250 mm×360 mm×thickness 3 mm, and using the core-back method, and attempt was made to produce a molded foam article having a flat shape (250 mm×360 mm×thickness 6 mm), but the amount introduced of the supercritical fluid could not be stabilized, fluctuations occurred in the resin pressure during the melt-kneading in the molding machine, the supercritical fluid could not be introduced in a stable manner at the desired settings, and even upon core-back expansion of the mold, regions occurred in which foaming did not occur as designed, making it impossible to obtain the desired molded foam article.

Comparative Example 2

The abovementioned LCP1 was mixed as a liquid crystal resin under the conditions shown in Table 1. Specifically, using a twin-screw extruder (PCM-30HS manufactured by Ikegai, Ltd.) and a water-sealed vacuum pump (SW-25 manufactured by Shinko Seiki Co., Ltd.), the resin component was fed into the extruder from a feeder with the cylinder temperature set to 320° C., and was subjected to melt-kneading by the screws with an inserted kneading block, while degassing was conducted through a vacuum vent. The discharged strand was cut to obtain pellets of the resin composition.

Using a fully electric molding machine J110AD-180H manufactured by The Japan Steel Works, Ltd., and a supercritical fluid production unit having a feedback control function for the amount introduced of the supercritical fluid (SCF SYSTEM T-100J, manufactured by Trexel, Inc., recorded as "Device B" in Table 1), the resin composition of the pellets produced using the above method was heated and metered inside the cylinder with the temperature set to 330° C., while nitrogen in a supercritical state (a supercritical fluid) was introduced under the conditions shown in Table 1. The melted resin containing the dissolved supercritical fluid was injected at a temperature setting of 120° C. into a mold having a cavity shape of 150 mm×150 mm×thickness 1.2 mm, and the core-back method was used to obtain a molded foam body having a flat shape (150 mm×150 mm×thickness 2.4 mm).

In the molded foam article of Comparative Example 2, because the LCP had a low melt tension and the melt viscosity of the resin composition was also too low, not only did the gas bubbles coalesce during foaming, causing a deterioration in the foamed state inside the molded article, but fluctuations in the weight of the molded articles also increased.

Comparative Example 3

The abovementioned LCP6 was mixed as a liquid crystal resin under the conditions shown in Table 1. Specifically, using a twin-screw extruder (PCM-30HS manufactured by Ikegai, Ltd.) and a water-sealed vacuum pump (SW-25 manufactured by Shinko Seiki Co., Ltd.), the resin component was fed into the extruder from a feeder with the cylinder temperature set to 370° C., and was subjected to melt-kneading by the screws with an inserted kneading block, while degassing was conducted through a vacuum vent. The discharged strand was cut to obtain pellets of the resin composition.

Using a fully electric molding machine J110AD-180H manufactured by The Japan Steel Works, Ltd., and a supercritical fluid production unit having a feedback control function for the amount introduced of the supercritical fluid (SCF SYSTEM T-100J, manufactured by Trexel, Inc., recorded as "Device B" in Table 1), the resin composition of the pellets produced using the above method was heated and metered inside the cylinder with the temperature set to 380°

C., while nitrogen in a supercritical state (a supercritical fluid) was introduced under the conditions shown in Table 1. The melted resin containing the dissolved supercritical fluid was injected at a temperature setting of 120° C. into a mold having a cavity shape of 150 mm×150 mm×thickness 1.2 mm, and the core-back method was used to obtain a molded foam body having a flat shape (150 mm×150 mm×thickness 2.4 mm).

Examples 6 and 7, Comparative Examples 3 and 4

The abovementioned LCP3 was mixed as a liquid crystal resin under the conditions shown in Table 1. Specifically, using a twin-screw extruder (PCM-30HS manufactured by Ikegai, Ltd.) and a water-sealed vacuum pump (SW-25 manufactured by Shinko Seiki Co., Ltd.), the resin component was fed into the extruder from a feeder with the cylinder temperature set to 350° C., and was subjected to melt-kneading by the screws with an inserted kneading block, while degassing was conducted through a vacuum vent. The discharged strand was cut to obtain pellets of the resin composition. Using a fully electric molding machine J110AD-180H manufactured by The Japan Steel Works, Ltd., and a supercritical fluid production unit having a feedback control function for the amount introduced of the supercritical fluid (SCF SYSTEM T-100J, manufactured by Trexel. Inc., recorded as "Device B" in Table 1), the resin composition of the pellets produced using the above method was heated and metered inside the cylinder with the temperature set to 360° C., while nitrogen in a supercritical state (a supercritical fluid) was introduced under the conditions shown in Table 1, and the melted resin containing the dissolved supercritical fluid was injected at a temperature setting of 120° C. into a mold having a cavity shape of 150 mm×150 mm×thickness 1.2 mm, and the core-back method was used to obtain a molded foam body having a flat shape (150 mm×150 mm×thickness 2.4 mm).

In the molded foam articles of Comparative Examples 3 and 4, because the amount introduced of the supercritical fluid was too large, not only did the gas bubbles coalesce during foaming, causing a deterioration in the foamed state inside the molded articles, but fluctuations in the weight of the molded articles also increased.

Examples 8 and 9, Comparative Example 5

The abovementioned LCP2 or LCP5 as a liquid crystal resin, and glass fiber were mixed under the conditions shown in Table 1. Specifically, using a twin-screw extruder (PCM-30HS manufactured by Ikegai, Ltd.) and a water-sealed vacuum pump (SW-25 manufactured by Shinko Seiki Co., Ltd.), the resin component and the inorganic filler were fed into the extruder from a feeder with the cylinder temperature set to 350° C., and were subjected to melt-kneading by the screws with an inserted kneading block, while degassing was conducted through a vacuum vent. The discharged strand was cut to obtain pellets of the resin composition. Using a fully electric molding machine J110AD-180H manufactured by The Japan Steel Works, Ltd., and a supercritical fluid production unit having a feedback control function for the amount introduced of the supercritical fluid (SCF SYSTEM T-100J, manufactured by Trexel, Inc., recorded as "Device B" in Table 1), the resin composition of the pellets produced using the above method was heated and metered inside the cylinder with the temperature set to 360° C., while nitrogen in a supercritical state (a supercritical fluid) was introduced under the conditions shown in Table 1, and the melted resin containing the dissolved supercritical fluid was injected at a temperature setting of 120° C. into a mold having a cavity shape of 150 mm×150 mm×thickness 1.2 mm, and the core-back method was used to obtain a molded foam body having a flat shape (150 mm×150 mm×thickness 2.4 mm).

In the molding of the molded foam article of Comparative Example 5, although the amount introduced of the supercritical fluid was within a range from at least 0.1 parts by mass to not more than 0.3 parts by mass, because the specified amount of the supercritical fluid was only introduced at a frequency of once per three repetitions of plasticization metering (meaning the supercritical fluid was introduced at a frequency of once per 3 shots), the state of dispersion of the supercritical fluid impregnated into the melted resin inside the molding machine cylinder lost uniformity, and the foamed state inside the molded articles deteriorated.

For Examples 1 to 9 and Comparative Examples 1 to 5, the molding conditions, the LCP melt tension, the resin composition viscosity, the void ratio, the foamed state inside the molded article, the average weight of the molded bodies, the standard deviation of the weight of the molded articles, and an evaluation of the fluctuation in the weight of the molded articles are shown in Table 1. In Table 1, the symbols used have the following meanings.
  cGF: chopped glass fiber CS3J-260S (manufactured by Nitto Boseki Co., Ltd.)
  mGF: milled glass fiber EFH75-01 (manufactured by Central Glass Fiber Co., Ltd.)

TABLE 1

| Material | | Units | Example 1 | Example 2 | Example 3 | Example 4 | Example 5 | Example 6 | Example 7 | Example 8 | Example 9 | Comparative Example 1 | Comparative Example 2 | Comparative Example 3 | Comparative Example 4 | Comparative Example 5 |
|---|---|---|---|---|---|---|---|---|---|---|---|---|---|---|---|---|
| LCP | LCP1 | parts by mass | 100 | | | | | | | | | | | | | |
| | LCP2 | parts by mass | | 100 | | | | | | | | | 100 | | | |
| | LCP3 | parts by mass | | | 100 | | | | | | | | | | | |
| | TCP4 | parts by mass | | | | 100 | 100 | | | | 55 | | | 100 | | 55 |
| | LCP5 | parts by mass | | | | | | 100 | 100 | 60 | | 100 | | | | |
| | LCP6 | parts by mass | | | | | | | | | | | | | 100 | |
| cGF (short glass fiber) | CS3J-260S | parts by mass | | | | | | | | 40 | 45 | | | | | 45 |
| mGF (milled glass fiber) | EFH75-01 | parts by mass | | | | | | | | | | | | | | |
| Molding method | | | Foam molding | | | | | | | | | | | | | |
| Supercritical fluid injection device | | | Device B | | | | | | | | | Device A | | Device B | | |
| Type of supercritical fluid | | | Nitrogen | | | | | | | | | | | | | |
| Supercritical fluid injection frequency | | | Injection every repetition | | | | | | | | | | | | | intermittent injection (once per 3 shots) |
| Supercritical fluid average injection amount (injection amount per 100 parts by mass of LCP) | | parts by mass | 0.2 | 0.2 | 0.2 | 0.2 | 0.3 | 0.1 | 0.2 | 0.2 | 0.3 | 0.1 | 0.2 | 0.4 | 0.7 | 0.3 |
| Melt tension of neat LCP | | mN | 5 | 13 | 71 | 14 | 14 | 52 | 52 | 13 | 14 | 13 | 3 | 52 | 52 | 14 |
| Melt viscosity of resin composition | | Pa·s | 230 | 650 | 1600 | 410 | 410 | 4000 | 4000 | 3500 | 3400 | 650 | 20 | 4000 | 4000 | 3400 |
| Void ratio | | % | 1.35 | 0.95 | 0.15 | 0.94 | 1.24 | 0.10 | 0.56 | 0.33 | 0.26 | | 4.66 | 3.41 | 3.27 | 1.63 |
| Foamed state inside molded articles | | | C | B | A | B | C | A | B | A | A | Molded foam bodies not obtained | D | D | D | D |
| Average weight of molded articles | | g | 57.17 | 54.76 | 52.63 | 48.52 | 47.52 | 49.29 | 47.45 | 68.82 | 61.00 | | 58.01 | 42.44 | 43.60 | 64.23 |
| Standard deviation of weight of molded articles | | g | 0.28 | 0.25 | 0.13 | 0.04 | 0.26 | 0.05 | 0.24 | 0.27 | 0.08 | | 0.39 | 0.40 | 0.42 | 0.17 |
| Evaluation of fluctuation in weight of molded articles | | | C | C | A | A | C | A | B | C | A | | D | D | D | B |

As is evident from the results shown above in Table 1, Examples 1 to 9 which applied the present invention all exhibited a favorable foamed state inside the molded articles, and were able to produce molded foam bodies having little fluctuation in the weight of the molded articles.

In contrast, Comparative Examples 1 to 5 which did not apply the present invention not only all exhibited a poor foamed state inside the molded articles, but in some cases also suffered from a larger fluctuation in the weight of the molded articles.

Production of Resin Compositions, Examples 10 to 25, Comparative Examples 6 to 8

Examples 10 to 25

LCP2 produced in Production Example 2 and glass fiber were mixed in the blending ratios shown in Tables 2 and 3. Specifically, using a twin-screw extruder (PCM-30HS manufactured by Ikegai, Ltd.), the resin components were fed into the extruder from a feeder with the cylinder temperature set to 340° C., and were subjected to melt-kneading by the screws with an inserted kneading block. The discharged strand was cut to obtain pellets of the resin composition.

<<Production of Solid Molded Articles of Examples 10 to 17>>

Using a fully electric molding machine J110AD-180H manufactured by The Japan Steel Works, Ltd., the pellets produced using the method described above were used to produce solid molded articles. When producing the solid molded articles, no supercritical fluid injection was performed. The resin composition was heated and metered inside the cylinder with the temperature set to 360° C., and the melted resin was injected at a temperature setting of 80° C. into a mold having a cavity shape of 150 mm×150 mm×thickness 3 mm or 150 mm×150 mm×thickness 4 mm to obtain a solid molded body having a flat shape.

<<Production of Molded Foam Articles of Examples 18 to 25>>

Using a fully electric molding machine J110AD-180H manufactured by The Japan Steel Works, Ltd., and a supercritical fluid production unit having a feedback control function for the amount introduced of the supercritical fluid (SCF SYSTEM T-100J, manufactured by Trexel, Inc., recorded as "Device B" in Table 2), the resin composition of the pellets produced using the above method was heated and metered inside the cylinder with the temperature set to 360° C., while nitrogen in a supercritical state was introduced under the conditions shown in Table 2. The melted resin containing the dissolved supercritical fluid was injected at a temperature setting of 80° C. into a mold having a cavity shape prior to core-back of 150 mm×150 mm×thickness 1.5 mm or 150 mm×150 mm×thickness 2 mm, and the core-back method was used to obtain a molded foam body having a flat shape (150 mm×150 mm×thickness 3 mm or 150 nm×150 mm×thickness 4 mm).

<<Production of Solid Molded Article of Comparative Example 6>>

A polyamide 66 (hereinafter sometimes abbreviated as PA66) resin composition (Ultramid A3WG6 (a blended product containing 30% by mass of glass fiber)) was molded as a polyamide resin under the conditions shown in Table 2. Using a fully electric molding machine PNX40-5A manufactured by Nissei Plastic Industrial Co., Ltd., the resin composition was heated and metered inside the cylinder with the temperature set to 280° C., and the melted resin was injected at a temperature setting of 80° C. into a mold having a cavity shape corresponding with an ISO 3167 A-type dumbbell test piece (shape of parallel portion: 80 mm×10 mm×thickness 4 mm) to obtain a solid molded article.

<<Production of Molded Foam Articles of Comparative Examples 7 and 8>>

A PA66 resin composition (Ultramid A3WG6 (a blended product containing 30% by mass of glass fiber)) was molded as a polyamide resin under the conditions shown in Table 3. Using a fully electric molding machine J110AD-180H manufactured by The Japan Steel Works, Ltd., and a supercritical fluid production unit having a feedback control function for the amount introduced of the supercritical fluid (SCF SYSTEM T-100J, manufactured by Trexel, Inc., recorded as "Device B" in Table 3), the resin composition was heated and metered inside the cylinder with the temperature set to 280° C., while nitrogen in a supercritical state was introduced under the conditions shown in Table 2. The melted resin containing the dissolved supercritical fluid was injected at a temperature setting of 80° C. into a mold having a cavity shape prior to core-back of 150 mm×150 mm×thickness 1.5 mm or 150 mm×150 mm×thickness 2 mm, and the core-back method was used to obtain a molded foam body having a flat shape (150 mm×150 mm×thickness 3 mm or 150 mm×150 mm×thickness 4 mm).

For the above Examples 10 to 25 and Comparative Examples 6 to 8, the molding conditions, the average flexural strength of the molded articles, the weight reduction ratio for the molded foam article, the strength retention ratio for the average flexural strength of the molded foam articles, the ratio of the strength retention ratio for the average flexural strength relative to the weight reduction ratio for the molded foam article (ratio A), the difference in the ratio A between a molded foam article of thickness 4 mm and a molded foam article of thickness 3 mm, and an evaluation of the size of the difference in the ratio A between a molded foam article of thickness 4 mm and a molded foam article of thickness 3 mm are shown in Tables 2 and 3. In Tables 2 and 3, the symbol used has the following meaning.

cGF: chopped glass fiber CS3J-260S (manufactured by Nitto Boseki Co., ld.)

TABLE 2

| | Item | Units | Example 10 | Example 11 | Example 12 | Example 13 | Example 14 |
|---|---|---|---|---|---|---|---|
| Materials | LCP2 | parts by mass | 100 | 100 | 90 | 90 | 80 |
| | PA66 resin composition | parts by mass | — | — | — | — | — |
| | cGF | parts by mass | — | — | 10 | 10 | 20 |
| Molding | Molding method | — | | | Solid molding | | |
| | Supercritical fluid injection device | — | — | — | — | — | — |
| | Type of supercritical fluid | — | — | — | — | — | — |
| | Supercritical fluid average injection amount (injection amount per 100 parts by mass of LCP) | parts by mass | — | — | — | — | — |

TABLE 2-continued

| | | | | | | | |
|---|---|---|---|---|---|---|---|
| Evaluations | Thickness of molded article | mm | 4 | 3 | 4 | 3 | 4 |
| | Specific gravity of molded article | g/cm³ | 1.36 | 1.38 | 1.41 | 1.43 | 1.48 |
| | Average flexural strength of molded article | MPa | 137 | 154 | 138 | 148 | 137 |
| | Weight reduction ratio for molded foam article | % | — | — | — | — | — |
| | Strength retention ratio for average flexural strength of molded foam article | % | — | — | — | — | — |
| | Ratio of the strength retention ratio for the average flexural strength relative to the weight reduction ratio for molded foam article (ratio A) | — | — | — | — | — | — |
| | Difference in ratio A between molded foam article of thickness 4 mm and molded foam article of thickness 3 mm | — | — | — | — | — | — |
| | Evaluation of size of difference in ratio A between molded foam article of thickness 4 mm and molded foam article of thickness 3 mm | — | — | — | — | — | — |

| | Item | Units | Example 15 | Example 16 | Example 17 | Comparative Example 6 |
|---|---|---|---|---|---|---|
| Materials | LCP2 | parts by mass | 80 | 70 | 70 | 100 |
| | PA66 resin composition | parts by mass | — | — | — | — |
| | cGF | parts by mass | 20 | 30 | 30 | — |
| Molding | Molding method | — | | Solid molding | | |
| | Supercritical fluid injection device | — | — | — | — | — |
| | Type of supercritical fluid | — | — | — | — | — |
| | Supercritical fluid average injection amount (injection amount per 100 parts by mass of LCP) | parts by mass | — | — | — | — |
| Evaluations | Thickness of molded article | mm | 3 | 4 | 3 | 4 |
| | Specific gravity of molded article | g/cm³ | 1.50 | 1.52 | 1.51 | 1.33 |
| | Average flexural strength of molded article | MPa | 152 | 137 | 147 | 218 |
| | Weight reduction ratio for molded foam article | % | — | — | — | — |
| | Strength retention ratio for average flexural strength of molded foam article | % | — | — | — | — |
| | Ratio of the strength retention ratio for the average flexural strength relative to the weight reduction ratio for molded foam article (ratio A) | — | — | — | — | — |
| | Difference in ratio A between molded foam article of thickness 4 mm and molded foam article of thickness 3 mm | — | — | — | — | — |
| | Evaluation of size of difference in ratio A between molded foam article of thickness 4 mm and molded foam article of thickness 3 mm | — | — | — | — | — |

TABLE 3

| | Item | Units | Example 18 | Example 19 | Example 20 | Example 21 | Example 22 |
|---|---|---|---|---|---|---|---|
| Materials | LCP2 | parts by mass | 100 | 100 | 90 | 90 | 80 |
| | PA66 resin composition | parts by mass | — | — | — | — | — |
| | cGF | parrs by mass | — | — | 10 | 10 | 20 |
| Molding | Molding method | — | | | Foam molding | | |
| | Supercritical fluid injection device | — | | | Device B | | |
| | Type of supercritical fluid | — | | | Nitrogen | | |
| | Supercritical fluid average injection amount (injection amount per 100 parts by mass of LCP) | parts by mass | 0.3 | 03 | 0.3 | 0.3 | 0.3 |
| Evaluations | Thickness of molded article | mm | 4 | 3 | 4 | 3 | 4 |
| | Specific gravity of molded article | g/cm³ | 0.72 | 0.7.3 | 0.72 | 0.73 | 0.75 |
| | Average flexural strength of molded article | MPa | 69 | 78 | 76 | 86 | 81 |
| | Weight reduction ratio for molded foam article | % | 47.1 | 47.1 | 48.9 | 49.0 | 49.3 |
| | Strength retention ratio for average flexural strength of molded foam article | % | 50.4 | 50.6 | 55.1 | 58.1 | 59.1 |
| | Ratio of the strength retention ratio for the average flexural strength relative to the weight reduction ratio for molded foam article (ratio A) | — | 1.055 | 1.048 | 0.918 | 0.856 | 0.829 |
| | Difference in ratio A between molded foam article of thickness 4 mm and molded foam article of thickness 3 mm | — | — | 0.007 | — | 0.062 | — |
| | Evaluation of size of difference in ratio A between molded foam article of thickness 4 mm and molded foam article of thickness 3 mm | — | — | B | — | A | — |

TABLE 3-continued

| Item | | Units | Example 23 | Example 24 | Example 25 | Comparative Example 7 | Comparative Example 8 |
|---|---|---|---|---|---|---|---|
| Materials | LCP2 | parts by mass | 80 | 70 | 70 | 100 | 100 |
| | PA66 resin composition | parts by mass | — | — | — | — | — |
| | cGF | parrs by mass | 20 | 30 | 30 | — | — |
| Molding | Molding method | — | | | Foam molding | | |
| | Supercritical fluid injection device | — | | | Device B | | |
| | Type of supercritical fluid | — | | | Nitrogen | | |
| | Supercritical fluid average injection amount (injection amount per 100 parts by mass of LCP) | parts by mass | 0.3 | 0.3 | 0.3 | 0.7 | 0.7 |
| Evaluations | Thickness of molded article | mm | 3 | 4 | 3 | 4 | 3 |
| | Specific gravity of molded article | g/cm³ | 0.78 | 0.81 | 0.85 | 0.68 | 0.77 |
| | Average flexural strength of molded article | MPa | 95 | 86 | 97 | 58 | 79 |
| | Weight reduction ratio for molded foam article | % | 48.0 | 46.7 | 43.7 | 48.9 | 42.1 |
| | Strength retention ratio for average flexural strength of molded foam article | % | 62.5 | 62.8 | 66.0 | 26.6 | 36.2 |
| | Ratio of the strength retention ratio for the average flexural strength relative to the weight reduction ratio for molded foam article (ratio A) | — | 0.781 | 0.797 | 0.778 | 1,502 | 1.514 |
| | Difference in ratio A between molded foam article of thickness 4 mm and molded foam article of thickness 3 mm | — | 0.047 | — | 0.019 | — | −0.013 |
| | Evaluation of size of difference in ratio A between molded foam article of thickness 4 mm and molded foam article of thickness 3 mm | — | A | — | B | — | C |

As is evident from the results shown above in Tables 2 and 3, Examples 18 to 25 which applied the present invention all exhibited a tendency for an improvement in the strength retention ratio as the thickness of the molded foam article was reduced.

In contrast, Comparative Examples 7 and 8 did not exhibit a tendency for an improvement in the strength retention ratio even when the thickness of the molded foam article was reduced.

INDUSTRIAL APPLICABILITY

The present invention can provide a method for producing molded foam articles that enables a resin composition containing an LCP to be foamed uniformly, and enables suppression of fluctuations in the weight of the molded foam articles, and can also provide molded foam articles, and is therefore extremely useful industrially.

EXPLANATION OF REFERENCES

1: Injection molding machine
11: Main body
12: Mold
21: Introduction device
111: Cylinder
112: Screw
113: Hopper
211: Gas cylinder
212: Pressurizer
213: Control valve

The invention claimed is:

1. A method for producing molded foam articles that molds molded foam articles continuously, the method comprising continuously repeating step 1, step 2, step 3 and step 4 described below in this order, wherein
step 1 comprises melting a resin composition that includes a liquid crystal polyester,
step 2 comprises introducing, with an introduction device, a supercritical fluid that is unreactive, in a supercritical state, with the liquid crystal polyester, and is a gas at normal temperature and normal pressure, into the resin composition in an amount of at least 0.1 parts by mass but not more than 0.3 parts by mass per 100 parts by mass of the liquid crystal polyester to form a resin composition mixture, and then melt-kneading the resin composition mixture,
step 3 comprises injecting the melt-kneaded resin composition mixture containing the supercritical fluid into a mold, and
step 4 comprises conducting foaming by lowering at least one of a pressure and a temperature of the supercritical fluid contained in the resin composition mixture to a value below a critical point of the supercritical fluid; and
the method further comprises measuring an amount introduced of the supercritical fluid; and
performing feedback control of the amount introduced of the supercritical fluid based on a measurement result; and
the liquid crystal polyester has a melt tension at a temperature 20° C. higher than a flow start temperature of at least 5 mN but not more than 100 mN.

2. The method for producing molded foam articles according to claim 1, wherein the liquid crystal polyester has a repeating unit represented by formula (1) shown below, a repeating unit represented by formula (2) shown below, and a repeating unit represented by formula (3) shown below:

  (1)

  (2)

  (3)

wherein $Ar^1$ represents a phenylene group, naphthylene group or biphenylylene group; $Ar^2$ and $Ar^3$ each independently represent a phenylene group, naphthylene group, biphenylylene group, or a group represented by formula (4) shown below; X and Y each independently represent an oxygen atom or an imino group; and at least one hydrogen atom in $Ar^1$, $Ar^2$ and $Ar^3$ may be independently substituted with a halogen atom, an alkyl group or an aryl group,

  (4)

wherein Ar⁴ and Ar⁵ each independently represent a phenylene group or a naphthylene group; and Z represents an oxygen atom, sulfur atom, carbonyl group, sulfonyl group or alkylidene group.

3. The method for producing molded foam articles according to claim 1, wherein following injection of the melt-kneaded resin composition containing the supercritical fluid into the mold, the resin composition containing the supercritical fluid is foamed using a core-back method.

4. The method for producing molded foam articles according to claim 1, wherein the supercritical fluid is nitrogen.

5. The method for producing molded foam articles according to claim 1, wherein the resin composition comprises an inorganic filler in an amount exceeding 0 parts by mass but not more than 100 parts by mass per 100 parts by mass of the liquid crystal polyester.

6. The method for producing molded foam articles according to claim 1, wherein a viscosity of the resin composition at a temperature 20° C. higher than a flow start temperature is at least 200 Pa·s but not more than 5,000 Pa·s.

7. A molded foam article that is molded from a foaming material and a resin composition by the method according to claim 1, wherein the resin composition comprises a liquid crystal polyester containing a repeating unit represented by formula (1) shown below, a repeating unit represented by formula (2) shown below and a repeating unit represented by formula (3) shown below, and also comprises an inorganic filler, an amount of the inorganic filler exceeds 0 parts by mass but is not more than 100 parts by mass per 100 parts by mass of the liquid crystal polyester, the resin composition has a viscosity at a temperature 20° C. higher than a flow start temperature of the resin composition of at least 200 Pa·s but not more than 5,000 Pa·s, and the liquid crystal polyester has a melt tension at a temperature 20° C. higher than a flow start temperature of the liquid crystal polyester of at least 5 mN but not more than 100 mN:

$$—O—Ar^1—CO— \quad (1)$$

$$—CO—Ar^2—CO— \quad (2)$$

$$—X—Ar^3—Y— \quad (3)$$

wherein Ar¹ represents a phenylene group, naphthylene group or biphenylylene group; Ar² and Ar³ each independently represent a phenylene group, naphthylene group, biphenylylene group, or a group represented by formula (4) shown below; X and Y each independently represent an oxygen atom or an imino group; and at least one hydrogen atom in Ar¹, Ar² and Ar³ may be independently substituted with a halogen atom, an alkyl group or an aryl group, $$—Ar^4—Z—Ar^5— \quad (4)$$

wherein Ar⁴ and Ar⁵ each independently represent a phenylene group or a naphthylene group; and Z represents an oxygen atom, sulfur atom, carbonyl group, sulfonyl group or alkylidene group.

8. The molded foam article according to claim 7, having a thin-wall portion with a thickness of 4.0 mm or less.

* * * * *